(12) United States Patent
Nakayama et al.

(10) Patent No.: US 12,554,194 B2
(45) Date of Patent: Feb. 17, 2026

(54) CONDUCTIVE SUBSTRATE COMPRISING A CONDUCTIVE THIN WIRE CONTAINING A METAL AND METHOD OF MAKING THEREOF

(71) Applicant: FUJIFILM Corporation, Tokyo (JP)

(72) Inventors: Aya Nakayama, Kanagawa (JP); Katsuyuki Nukui, Kanagawa (JP); Yuya Motomura, Kanagawa (JP); Toru Ogawa, Kanagawa (JP); Shinichi Nakahira, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 604 days.

(21) Appl. No.: 17/707,373

(22) Filed: Mar. 29, 2022

(65) Prior Publication Data

US 2022/0342300 A1 Oct. 27, 2022

(30) Foreign Application Priority Data

Apr. 9, 2021 (JP) .................... 2021-066722
Jul. 1, 2021 (JP) .................... 2021-110396
Jul. 29, 2021 (JP) .................... 2021-124371

(51) Int. Cl.
*B32B 7/025* (2019.01)
*G03F 7/004* (2006.01)
(Continued)

(52) U.S. Cl.
CPC ............ *G03F 7/0042* (2013.01); *G03F 7/327* (2013.01); *G06F 3/044* (2013.01); *H01B 1/02* (2013.01);
(Continued)

(58) Field of Classification Search
CPC .......... B32B 7/025; B32B 7/03; B32B 9/041; B32B 15/02; H10K 77/111
See application file for complete search history.

(56) References Cited

U.S. PATENT DOCUMENTS

2009/0295285 A1* 12/2009 Tokunaga ............ H10K 50/814
430/4
2012/0321781 A1 12/2012 Zettelmeyer
(Continued)

FOREIGN PATENT DOCUMENTS

JP 2001-164373 A 6/2001
JP 2009-004348 A 1/2009
(Continued)

OTHER PUBLICATIONS

Translation WO 2020158494 A1 (Year: 2020).*
(Continued)

*Primary Examiner* — Hoa (Holly) Le
(74) *Attorney, Agent, or Firm* — Edwards Neils LLC; Jean C. Edwards, Esq.

(57) ABSTRACT

A manufacturing method for a conductive substrate, with which a conductive substrate including a substrate and a conductive thin wire arranged on the substrate are manufactured, includes in the following order, a step 1 of forming a thin wire containing a metal on the substrate; a step 2 of bringing the thin wire into contact with a solution containing an organic acid; and a step 3 of subjecting the thin wire to a plating treatment to form a conductive thin wire.

7 Claims, 10 Drawing Sheets

(51) Int. Cl.
    *G03F 7/32*         (2006.01)
    *G06F 3/044*       (2006.01)
    *H01B 1/02*         (2006.01)
    *H01B 3/42*         (2006.01)
    *H01B 5/14*         (2006.01)
    *H01B 19/04*       (2006.01)

(52) U.S. Cl.
    CPC ............... *H01B 3/427* (2013.01); *H01B 5/14* (2013.01); *H01B 19/04* (2013.01); *G06F 2203/04103* (2013.01); *G06F 2203/04112* (2013.01)

(56) References Cited

U.S. PATENT DOCUMENTS

2014/0054070 A1*   2/2014   Ichiki .................. H05K 1/0274
                                                                           174/253

2023/0053715 A1*   2/2023   Sawaki ................. C08F 290/06
2023/0168766 A1*   6/2023   Itoh ..................... G06F 3/04164
                                                                            345/174

FOREIGN PATENT DOCUMENTS

| JP | 2010-047828 A | 3/2010 |
| JP | 4895536 B2 | 3/2012 |
| JP | 2012-521490 A | 9/2012 |
| JP | 2021-055162 A | 4/2021 |
| WO | WO-2020158494 A1 * | 8/2020 |

OTHER PUBLICATIONS

Office Action which was issued by the Japanese Patent Office on Apr. 1, 2025, in connection with Japanese Patent Application No. 2021-124371.

* cited by examiner

CONDUCTIVE SUBSTRATE COMPRISING A CONDUCTIVE THIN WIRE CONTAINING A METAL AND METHOD OF MAKING THEREOF

CROSS-REFERENCE TO RELATED APPLICATIONS

The present application claims priority under 35 U.S.C. § 119 to Japanese Patent Application No. 2021-066722 filed on Apr. 9, 2021, Japanese Patent Application No. 2021-110396 filed on Jul. 1, 2021, and Japanese Patent Application No. 2021-124371 filed on Jul. 29, 2021. The above applications are hereby expressly incorporated by reference, in their entirety, into the present application.

BACKGROUND OF THE INVENTION

1. Field of the Invention

The present invention relates to a manufacturing method for a conductive substrate having a conductive thin wire, and a conductive substrate.

2. Description of the Related Art

Conductive substrates having conductive thin wires (thin wire-shaped wires that exhibit conductivity) are widely used in various use applications such as touch panels.

Regarding a conductive thin wire of a conductive substrate, a photosensitive layer containing a silver halide is subjected to an exposure treatment, a development treatment, and the like in sequence to form a conductive thin wire containing metallic silver, for example, as disclosed in JP4895536B.

JP4895536B discloses a manufacturing method for a conductive material using a conductive material precursor containing at least one silver halide emulsion layer on a support. In the manufacturing method for a conductive material in JP4895536B, the conductive material precursor is treated with an enzyme-containing treatment liquid containing an enzyme that acts on a binder that constitutes the silver halide emulsion layer, and then plated.

SUMMARY OF THE INVENTION

In a case where a conductive substrate having a conductive thin wire is used for a touch panel, the conductive thin wire is required to be conductive, that is, to have a small electric resistance, and is also required to be difficult to visible.

However, in JP4895536B, the above characteristics have been difficult to be compatible with each other.

An object of the present invention is to provide a manufacturing method for a conductive substrate having a conductive thin wire having a small electric resistance and being difficult to visible, and to provide a conductive substrate.

In order to achieve the above object, one aspect of the present invention provides a manufacturing method for a conductive substrate, with which a conductive substrate including a substrate and a conductive thin wire arranged on the substrate are manufactured, where manufacturing method includes, in the following order, a step 1 of forming a thin wire containing a metal on the substrate; a step 2 of bringing the thin wire into contact with a solution containing an organic acid; and a step 3 of subjecting the thin wire to a plating treatment to form a conductive thin wire.

It is preferable that a step 4 of subjecting the thin wire to a plating treatment is further provided between the step 1 and the step 2.

The pH value of the solution containing the organic acid is preferably in a range of 1.5 to 6.0 at a temperature of 25° C.

The solution containing the organic acid preferably contains a carboxylic acid.

The carboxylic acid is preferably a divalent or higher-valent carboxylic acid.

The carboxylic acid is preferably any one selected from the group consisting of glutaric acid and citric acid.

The solution containing the organic acid preferably further contains a quaternary ammonium salt.

The quaternary ammonium salt is preferably selected from the group consisting of a compound represented by General Formula (X), a compound represented by General Formula (Y), and a compound represented by General Formula (Z).

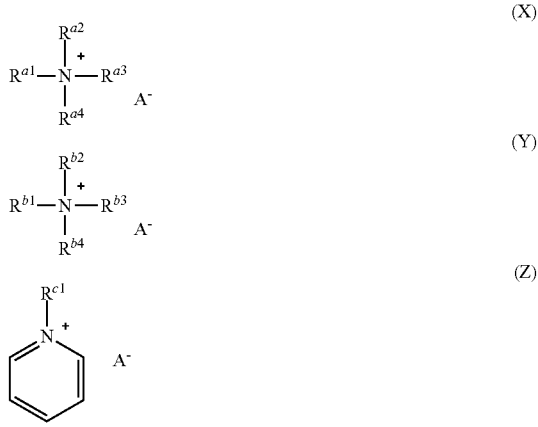

In General Formula (X), $R^{a1}$ and $R^{a2}$ each independently represent an alkyl group having 4 or less carbon atoms, which may have a substituent, and $R^{a3}$ and $R^{a4}$ each independently represent an alkyl group having 8 or more carbon atoms, which may have a substituent.

In General Formula (Y), $R^{b1}$ to $R^{b3}$ each independently represent an alkyl group having 4 or less carbon atoms, which may have a substituent, and $R^{b4}$ represents an alkyl group having 8 or more carbon atoms, which may have a substituent.

In General Formula (Z), $R^{c1}$ represents an alkyl group having 8 or more carbon atoms, which may have a substituent.

The solution containing the organic acid preferably contains a divalent or higher-valent carboxylic acid and a compound selected from the group consisting of a compound represented by General Formula (X), a compound represented by General Formula (Y), and a compound represented by General Formula (Z).

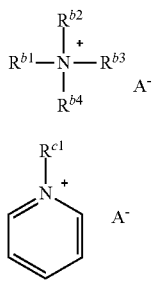

In General Formula (X), $R^{a1}$ and $R^{a2}$ each independently represent an alkyl group having 4 or less carbon atoms, which may have a substituent, and $R^{a3}$ and $R^{a4}$ each independently represent an alkyl group having 8 or more carbon atoms, which may have a substituent.

In General Formula (Y), $R^{b1}$ to $R^{b3}$ each independently represent an alkyl group having 4 or less carbon atoms, which may have a substituent, and $R^{b4}$ represents an alkyl group having 8 or more carbon atoms, which may have a substituent.

In General Formula (Z), $R^{c1}$ represents an alkyl group having 8 or more carbon atoms, which may have a substituent.

In the step 2, the time of contact between the thin wire and the solution containing the organic acid is preferably 5 to 180 seconds.

It is preferable that a step 5 of bringing the thin wire into contact with a solution containing a quaternary ammonium salt is further provided between the step 1 and the step 2 or between the step 2 and the step 3.

It is preferable that the step 3 or the step 4 has a neutralization and washing step of bringing the thin wire into contact with an acidic solution having a pH of 3 to 7 to stop a plating reaction by the plating treatment.

The acidic solution preferably has a buffering action.

The thin wire preferably contains a polymer.

One aspect of the present invention provides a conductive substrate including a substrate and a conductive thin wire arranged on the substrate and containing a metal, in which in a vertical cross section of the conductive thin wire in a direction orthogonal to a direction in which the conductive thin wire extends, a proportion of a region that shows the metal within a maximum inscribed circle of the observation region where the metal is observed is 81% to 99% and, a Gray value obtained by imaging the conductive thin wire using reflected light is 150 or less in terms of a value of brightness represented by 256 gradations. It is preferable that in a circumscribed quadrangle circumscribing the observation region where the metal is observed in which angles of four corners each have an angle of 90° and one side is parallel to a surface of the substrate, in a case where a quadrangle region of the circumscribed quadrangle on a side opposite to the surface of the substrate from an upper contact point which is set to one corner is defined as an upper circumscribed quadrangle, the upper contact point being located at a position farthest from the surface of the substrate among contact points between the observation region and sides of the circumscribed quadrangle perpendicular to the surface of the substrate, four corners of the upper circumscribed quadrangle each have an angle of 90°, and one side thereof is parallel to the surface of the substrate, and in the upper circumscribed quadrangle, in a case where a length of a contour of a region where the metal is present is denoted by Lm, a total length of four sides of the upper circumscribed quadrangle is denoted by Ls, and a ratio represented by Lm/Ls is denoted by γ, 1.3≤γ≤2.0 is satisfied.

The line width of the conductive thin wire is preferably 0.1 μm or more and less than 5.0 μm.

It is preferable that in the vertical cross section of the conductive thin wire in the direction orthogonal to the direction in which the conductive thin wire extends, a ratio of a height of the conductive thin wire to a line width of the conductive thin wire is 0.6 or more and less than 1.5. The substrate is preferably constituted of a flexible film.

The flexible film preferably contains polyethylene terephthalate, a cycloolefin polymer, a cycloolefin copolymer, or polycarbonate.

The metal contained in the conductive thin wire preferably includes silver.

The metal contained in the conductive thin wire is preferably silver.

The metal contained in the conductive thin wire preferably has a particle shape.

The conductive thin wire preferably contains a polymer.

According to the present invention, it is possible to provide a manufacturing method for a conductive substrate having a conductive thin wire having a small electric resistance and being difficult to visible, and to provide a conductive substrate.

DESCRIPTION OF THE PREFERRED EMBODIMENTS

Hereinafter, a manufacturing method for a conductive substrate and a conductive substrate according to the embodiment of the present invention will be described in detail based on suitable embodiments illustrated in the attached drawings.

The figures described below are exemplary for explaining the present invention, and the present invention is not limited to the figures illustrated below.

In the following, "to" indicating a numerical range includes numerical values described on both sides thereof. For example, in a case where ε is a numerical value $\varepsilon_\alpha$ to a numerical value $\varepsilon_\beta$, the range of ε is a range including the numerical value $\varepsilon_\alpha$ and the numerical value $\varepsilon_\beta$, and thus it is $\varepsilon_\alpha \le \varepsilon \le \varepsilon_\beta$ in a case of describing with mathematical symbols.

Angles described as, for example, "an angle represented by a specific numerical value", "parallel", "vertical", and "orthogonal" include error ranges generally tolerated in the art, unless otherwise described.

Conductive Substrate

Figure 1:
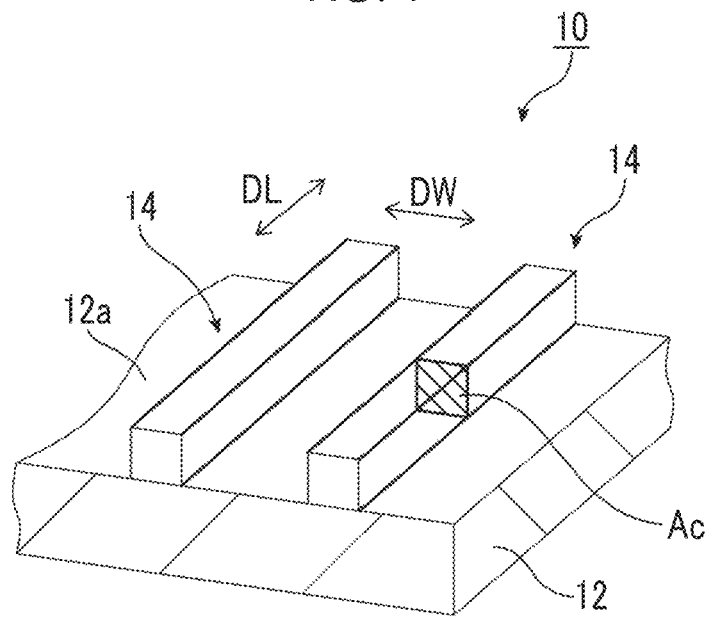
FIG. 1 is a schematic cross-sectional view illustrating an example of a conductive substrate according to an embodiment of the present invention.
Figure 2:
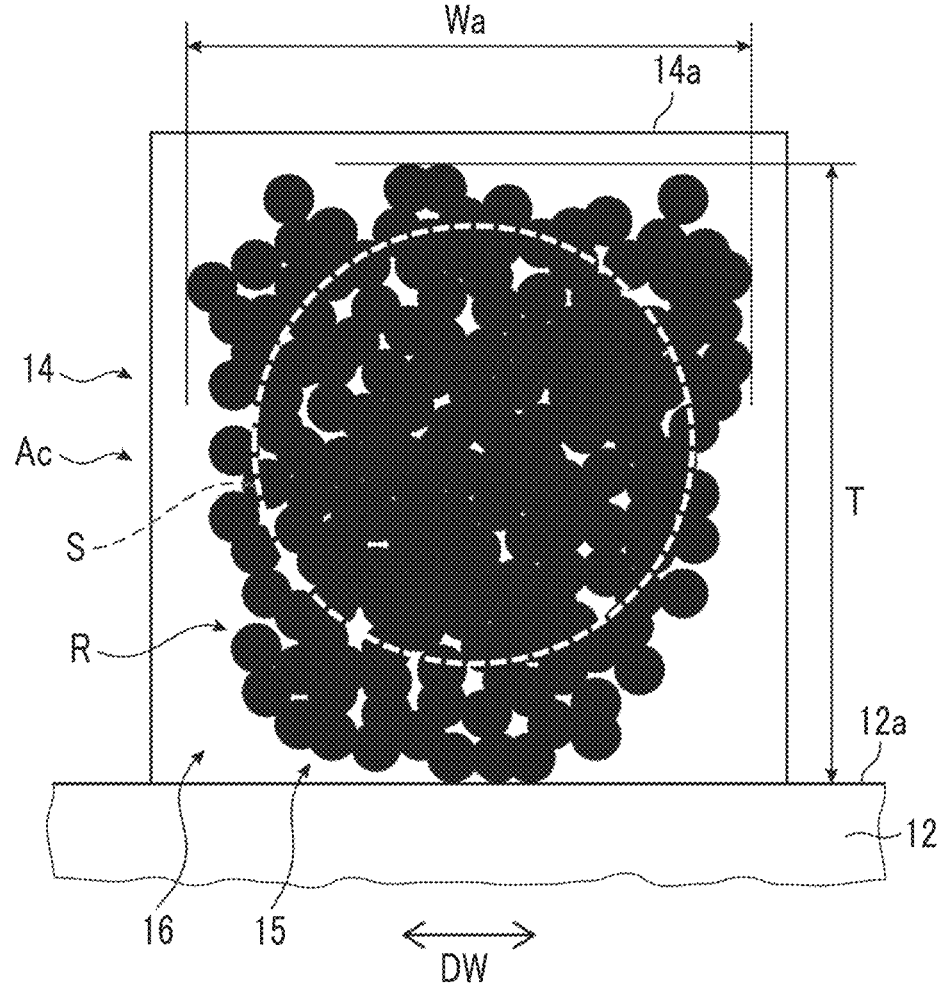
FIG. 2 is a schematic view illustrating an example of the conductive substrate according to the embodiment of the present invention.

FIG. 1 is a schematic cross-sectional view illustrating an example of a conductive substrate according to an embodiment of the present invention, and FIG. 2 is a schematic view illustrating an example of the conductive substrate according to the embodiment of the present invention.

The conductive substrate 10 has a substrate 12 and a conductive thin wire 14 arranged on the surface 12a of the substrate 12 and containing metal. Although two conductive thin wires 14 that extend in one direction are illustrated in FIG. 1, the arrangement form of the conductive thin wires 14 and the number thereof are not particularly limited.

The conductive thin wire 14 contains a metal as described above; however, it preferably contains, for example, a metal 15 and a polymer 16 as illustrated in FIG. 2. In the conductive thin wire 14 illustrated in FIG. 2, the metal 15 is present in the polymer 16. The metal 15 has, for example, a particle shape; however, the shape thereof is not limited to the particle shape, and it may be a form in which the metal 15 is fusion welded to be bonded partially or wholly.

FIG. 1 and FIG. 2 show a vertical cross section Ac of the conductive thin wire 14 in a direction DW orthogonal to a direction DL in which the conductive thin wire 14 extends. The vertical cross section Ac of the conductive thin wire 14 is a cross section obtained in a case where cutting is carried out at a plane orthogonal to the direction DL in which the conductive thin wire 14 extends. That is, the vertical cross section Ac of the conductive thin wire 14 is a cross section obtained in a case where cutting is carried out at a plane perpendicular to a surface 14a of the conductive thin wire 14 along the direction DW orthogonal to the direction DL in which the conductive thin wire 14 extends.

In the vertical cross section Ac of the conductive thin wire 14, a proportion of a region that shows the metal 15 within a maximum inscribed circle S of an observation region R where the metal 15 is observed is 81% to 99%. Among the above, it is preferably 86% or more and more preferably 88% or more. The upper limit thereof is preferably 96% or less and more preferably 94% or less.

In a case where the proportion of the above-described region that shows a metal is 81% to 99%, the electric resistance can be reduced, whereby conductivity can be obtained, and the wire visibility of the conductive thin wire 14 can be prevented.

In a case where the proportion of the region that shows the metal 15 in the conductive thin wire 14 is less than 81%, sufficient conductivity cannot be obtained. On the other hand, in a case where the proportion of the region that shows the metal 15 exceeds 99% in the conductive thin wire 14, bendability deteriorates.

The Gray value obtained by imaging the conductive thin wire 14 using reflected light is 150 or less in terms of a value of brightness represented by 256 gradations. The value of 256 gradations is a value corrected each time with a standard white board based on Japanese Industrial Standards (JIS) K5602. The Gray value is preferably 0 to 150 and more preferably 0 to 130 in terms of the brightness value. In a case where the above-described Gray value is 150 or less in terms of the brightness value, it is possible to prevent wire visibility of the conductive thin wire 14 without carrying out a blackening treatment.

For the Gray value, a digital microscope (VHX-5000) manufactured by KEYENCE Corporation is used, the conductive thin wire 14 is observed using reflected light as shown below at a lens magnification of 5,000 times and an illumination brightness of 70%, and an image is captured. A line corresponding to a length of 20 μm is drawn on the captured image of the conductive thin wire 14. Next, using an image processing software ImageJ, the Gray value of the above-described line corresponding to a length of 20 μm is calculated. The Gray value is calculated three times for one image, and the average value thereof is calculated. This average value is taken as the Gray value of the conductive thin wire 14. It is noted that the Gray value is measured every time after the calibration using a standard calibration board.

One conductive thin wire that extends is selected in the conductive substrate 10, and any place in the selected one conductive thin wire is selected to obtain the vertical cross section Ac. The vertical cross section Ac is observed with a scanning electron microscope, and the maximum inscribed circle S, the proportion of the region that shows a metal, and the ratio γ are determined as follows.

In the measuring method using a scanning electron microscope, Pt is coated using an ion sputtering device (an E-1030 type ion sputter, manufactured by Hitachi High-Tech Corporation) in order to impart conductivity to the surface of the conductive thin wire 14. In this state, the vertical cross section Ac of the conductive thin wire 14 is processed with an ion beam processing function of a scanning electron microscope having a focused ion beam processing function (Helios 600i manufactured by Thermo Fisher Scientific, Inc.), and the exposed cross-sectional morphology is observed, whereby the region where the metal 15 inside the conductive thin wire 14 is present can be observed, and an observation image of the vertical cross section Ac can be obtained. The observation is carried out under conditions of a backscattered electron mode and an acceleration voltage of 1 kV.

As illustrated in FIG. 2, the metal 15 is present in the vertical cross section Ac of the conductive thin wire 14.

The maximum inscribed circle S is the largest circle among the inscribed circles in the observation region R where the metal 15 is observed in the vertical cross section Ac.

Here, FIGS. 3 to 6 are schematic views illustrating, in the order of steps, a method of measuring a proportion of a region that shows a metal in a conductive thin wire of the conductive substrate according to the embodiment of the present invention.

Figure 3:
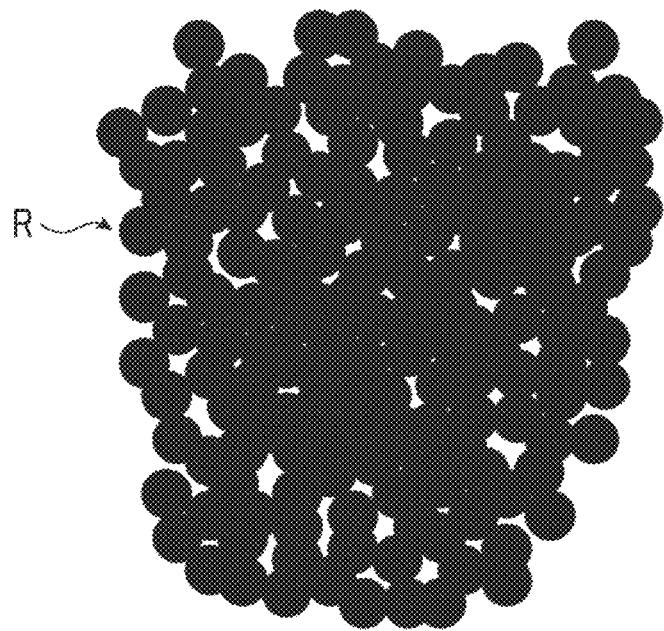
FIG. 3 is a schematic view illustrating one step of a method of measuring a proportion of a region that shows a metal in a conductive thin wire of the conductive substrate according to the embodiment of the present invention.

First, an observation image (not illustrated in the drawing) of the vertical cross section Ac (see FIG. 2) of the conductive thin wire 14 is obtained. The observation image is acquired in the form of image data that can be analyzed by a computer. The image data may be binary data, grayscale data, or RGB data. For example, the image data of the observation region R illustrated in FIG. 3 is obtained from the observation image.

Figure 4:
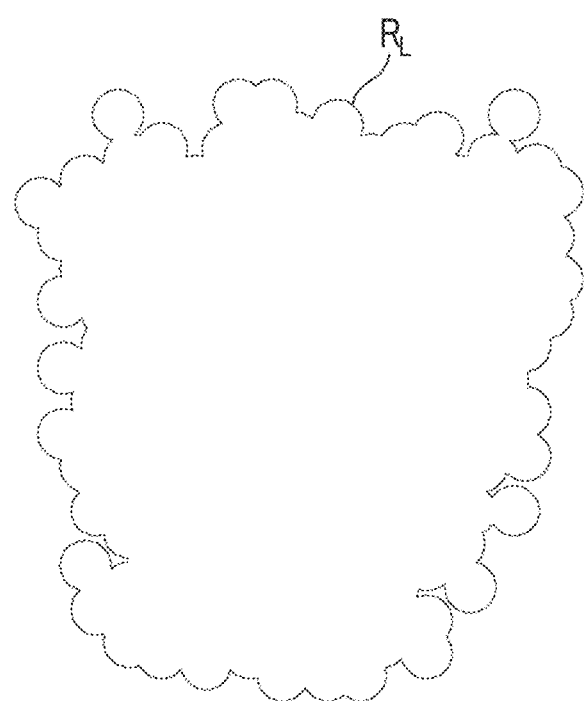
FIG. 4 is a schematic view illustrating one step of a method of measuring a proportion of a region that shows a metal in a conductive thin wire of the conductive substrate according to the embodiment of the present invention.
Figure 5:
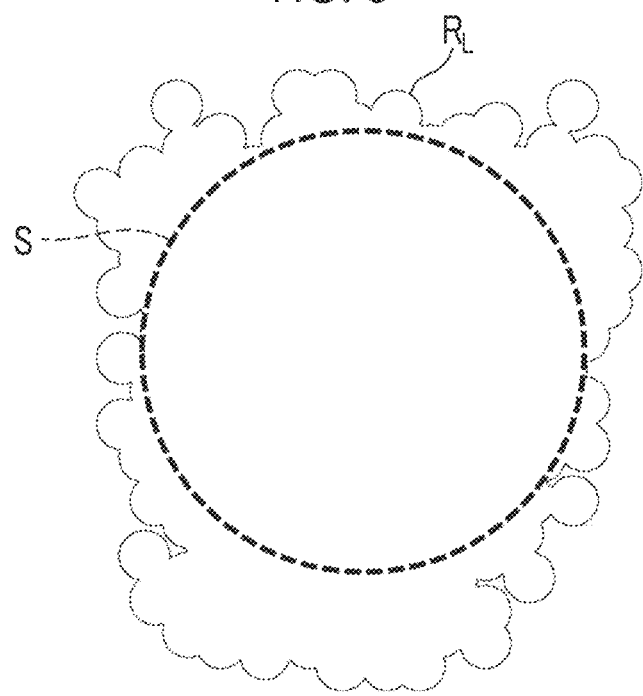
FIG. 5 is a schematic view illustrating one step of the method of measuring a proportion of a region that shows a metal in a conductive thin wire of the conductive substrate according to the embodiment of the present invention.

Next, a contour line $R_L$ illustrated in FIG. 4 is obtained from the observation region R. The contour line $R_L$ shows the contour of the observation region R where the metal is observed in the vertical cross section Ac (see FIG. 2). Within the vertical cross section Ac (see FIG. 2), the metal 15 is present in the contour line $R_L$.

The contour line $R_L$ is extracted from the image of the observation region R by using, for example, an image analysis software ImageJ. The image analysis software is not particularly limited to ImageJ as long as the contour line can be extracted.

Next, the maximum inscribed circle S is set for the contour line $R_L$. The maximum inscribed circle S is defined, for example, by randomly generating inscribed circles within the contour line $R_L$ and then setting the inscribed circle having the largest radius among the generated inscribed circles as the maximum inscribed circle S. In a case where there are a plurality of inscribed circles having the maximum radius, an inscribed circle in which the center position is close to the center of gravity in the image data of the observation region R is defined as the maximum inscribed circle S. For this reason, in a case where there are a plurality of inscribed circles having the maximum radius, the center of mass in the image data of the observation region R is determined, and the position information of the position of the center of mass is stored. The position of the center of mass can be determined by using a known method such as using an image processing software. The position information of the position of the center of mass is, for example, the position coordinates in the image data.

It is noted that the center position of the inscribed circle and the center position of the maximum inscribed circle S are not particularly limited as long as they are present within the contour line $R_L$. The position information of the center position of the maximum inscribed circle S is stored. The position information of the center position is, for example, the position coordinates in the image data.

Figure 6:
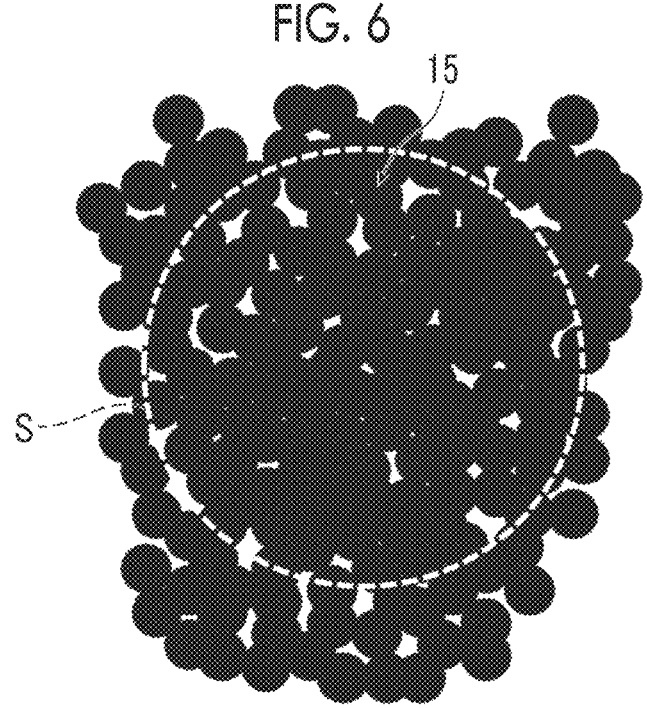
FIG. 6 is a schematic view illustrating one step of the method of measuring a proportion of a region that shows a metal in a conductive thin wire of the conductive substrate according to the embodiment of the present invention.

Next, as illustrated in FIG. 6, the maximum inscribed circle S is aligned with the observation region R obtained in FIG. 3 by using the position information of the center position of the maximum inscribed circle S. Next, the area of the region that shows the metal 15 within the maximum inscribed circle S is measured. Next, the area of the region that shows the metal 15 within the maximum inscribed circle S is denoted by Sm. The area of the maximum inscribed circle S is denoted by Ss. The area Sm of the region that shows the metal 15 within the maximum inscribed circle S with respect to the area Ss of the maximum inscribed circle S is determined. That is, (Sm/Ss)×100(%) is determined. As a result, the proportion (%) of the region that shows the metal within the maximum inscribed circle of the observation region where the metal is observed can be obtained.

Figure 7:
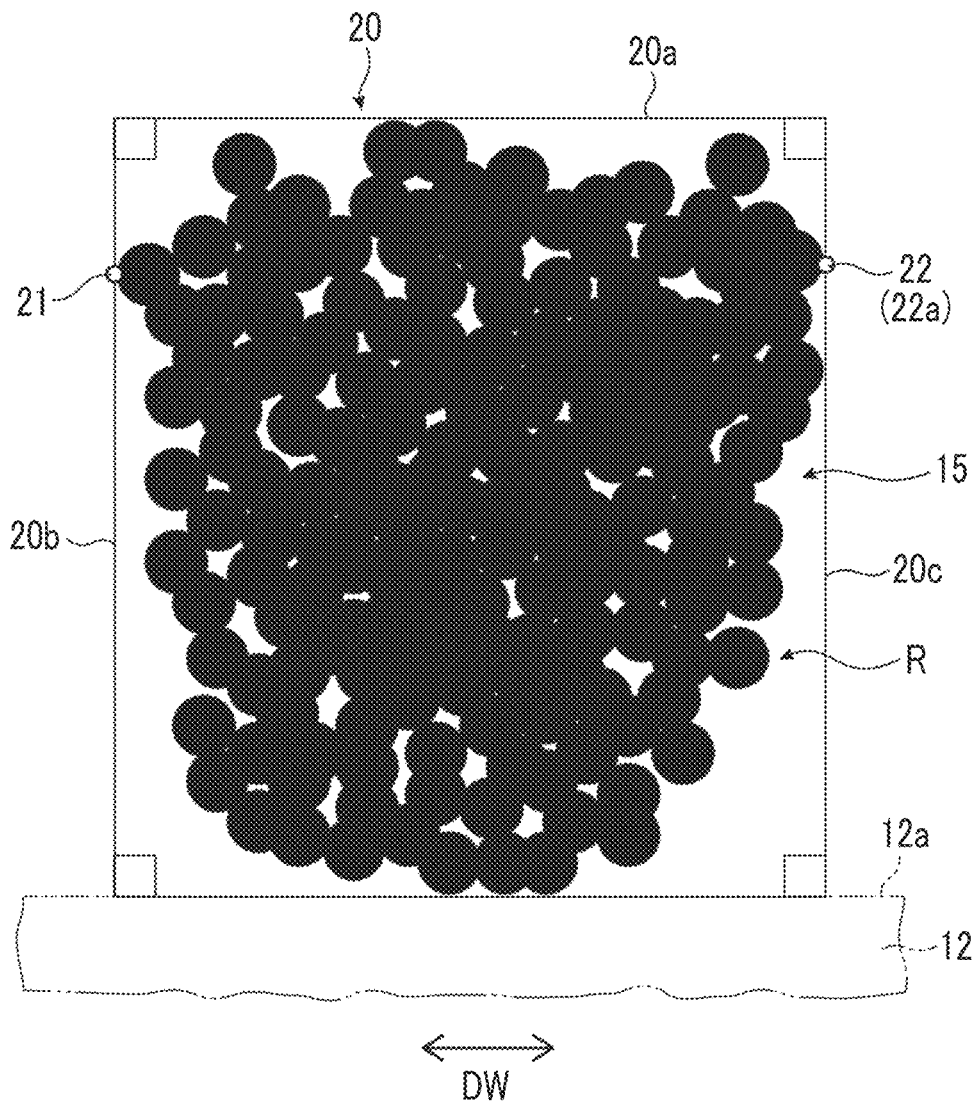
FIG. 7 is a schematic view illustrating a circumscribed quadrangle of a region that shows a metal in a conductive thin wire of the conductive substrate according to the embodiment of the present invention.
Figure 8:
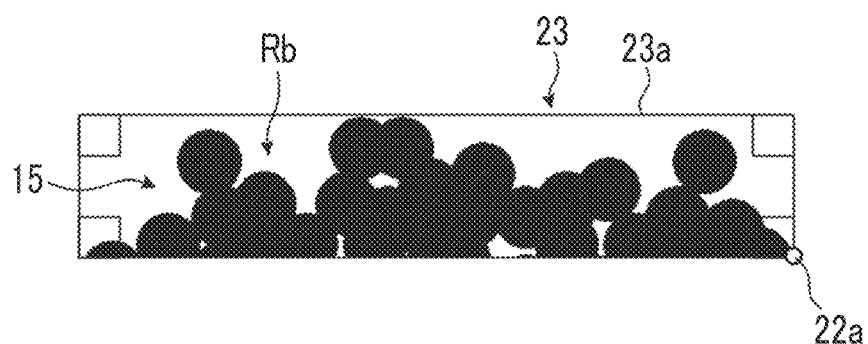
FIG. 8 is a schematic view illustrating a circumscribed quadrangle of a region that shows a metal in a conductive thin wire of the conductive substrate according to the embodiment of the present invention.
Figure 9:
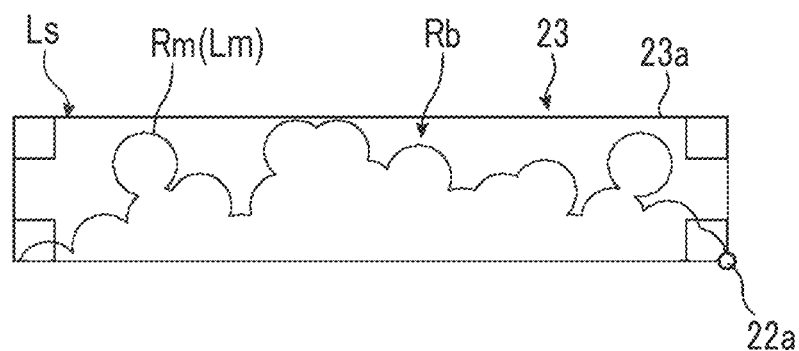
FIG. 9 is a schematic view illustrating a circumscribed quadrangle of a region that shows a metal in a conductive thin wire of the conductive substrate according to the embodiment of the present invention.

Here, FIG. 7 is a schematic view illustrating a circumscribed quadrangle of a region that shows a metal in a conductive thin wire of the conductive substrate according to the embodiment of the present invention, FIG. 8 is a schematic view illustrating a circumscribed quadrangle of a region that shows a metal in a conductive thin wire of the conductive substrate according to the embodiment of the present invention, and FIG. 9 is a schematic view illustrating a circumscribed quadrangle of a region that shows a metal in a conductive thin wire of the conductive substrate according to the embodiment of the present invention.

In addition, in the conductive thin wire 14, in a circumscribed quadrangle 20 circumscribing the observation region R where the metal 15 is observed in which angles of four corners are each 90° and one side 20a is parallel to the surface 12a of the substrate 12, in a case where a quadrangle region of the circumscribed quadrangle 20 on a side opposite to the surface 12a of the substrate 12 from an upper contact point 22a which is set to one corner is defined as an upper circumscribed quadrangle 23 (see FIGS. 8 and 9), the upper contact point 22a (see FIG. 8) being located at a position farthest from the surface 12a of the substrate 12 among contact points 21 and 22 between the observation region R and sides 20b and 20c of the circumscribed quadrangle 20 perpendicular to the surface 12a of the substrate 12, four corners of the upper circumscribed quadrangle 23 each have an angle of 90°, and one side 23a thereof is parallel to the surface 12a (see FIG. 7) of the substrate 12 (see FIG. 7).

Within the upper circumscribed quadrangle 23, in a case where a length of a contour line Rm (see FIG. 8) of a region Rb (see FIG. 8) where the metal 15 is present is denoted by Lm, a total length of four sides of the upper circumscribed quadrangle 23 (see FIG. 9) is denoted by Ls, and a ratio represented by Lm/Ls is denoted by γ, it is preferable to satisfy $1.3 \leq \gamma \leq 2.0$. The ratio γ represented by Lm/Ls is a parameter that reflects the unevenness on the side of the surface 14a of the conductive thin wire 14. In a case where the value of the ratio γ is large, the length Lm of the contour line Rm (see FIG. 8) of the region Rb (see FIG. 8) where the metal 15 is present is long, and the difference between the length Lm and the total length Ls of the four sides of the upper circumscribed quadrangle 23 (see FIG. 9) is large. That is, in a case where the value of the ratio γ is large, it indicates that the surface area of the conductive thin wire 14 is large, and the surface 14a of the conductive thin wire 14 is uneven. In a case where the value of the ratio γ is 2.0 or less, the unevenness of the surface 14a of the conductive thin wire 14 becomes a preferred size, the diffuse reflected light becomes small, and thus the conductive thin wire 14 becomes difficult to be visible.

In a case where the value of the ratio γ is small, the length Lm is short. That is, in a case where the value of the ratio γ is small, it indicates that the surface area of the conductive thin wire 14 is small, and the unevenness of the surface 14a of the conductive thin wire 14 is small. In a case where the value of the ratio γ is 1.3 or more, the unevenness of the surface 14a of the conductive thin wire 14 becomes a preferred size, the specular reflected light becomes small, and thus the conductive thin wire 14 becomes difficult to be visible.

In a case where the value of the ratio γ is 1.3≤γ≤2.0, the reflectivity of the conductive thin wire 14 is decreased, and thus the brightness is decreased.

For the above-described ratio γ, first, as illustrated in FIG. 7, the image data of the observation region R where the metal 15 is observed is obtained. The image data is data that can be analyzed by a computer as described above.

Next, the circumscribed quadrangle 20 that circumscribes the observation region R where the metal 15 is observed is set. As described above, four corners of the circumscribed quadrangle 20 each have an angle of 90°, and one side 20a thereof is parallel to the surface 12a of the substrate 12. Circumscribed quadrangles of which four corners each have an angle of 90° and of which one side is parallel to the surface 12a of the substrate 12 are randomly generated, and among the generated circumscribed quadrangles, the one having the largest area is the circumscribed quadrangle 20.

Next, the contact points 21 and 22 between the observation region R and the sides 20b and 20c perpendicular to the surface 12a of the substrate 12 of the circumscribed quadrangle 20 are determined. Among the contact points 21 and 22, the contact point 22 located at the position farthest from the surface 12a (see FIG. 7) of the substrate 12 (see FIG. 1) is defined as the upper contact point 22a (see FIG. 8). The quadrangle region on a side opposite to the substrate 12, from the upper contact point 22a of the circumscribed quadrangle 20, is defined as the upper circumscribed quadrangle 23 (see FIG. 8) of which one corner is set to this upper contact point 22a. The upper circumscribed quadrangle 23 is obtained, for example, by trimming the circumscribed quadrangle 20. As described above, four corners of the upper circumscribed quadrangle 23 each have an angle of 90°, and one side 23a thereof is parallel to the surface 12a (see FIG. 7) of the substrate 12 (see FIG. 7).

Within the upper circumscribed quadrangle 23, the contour line Rm (see FIG. 9) is obtained with respect to the region Rb (see FIG. 8) where the metal 15 is present. The contour line Rm illustrated in FIG. 9 can be obtained in the same manner as the above-described contour line $R_L$ (see FIG. 4).

Next, the length Lm of the contour line Rm is determined. Further, the total length Ls of the four sides of the upper circumscribed quadrangle 23 is determined. Next, the ratio γ represented by Lm/Ls is determined.

It is noted that the ratio γ is determined for the three conductive thin wires 14, and the average value thereof is used as the final value of the ratio γ.

The conductive thin wire contains a metal. The metal is a portion that guarantees the conductivity of the conductive thin wire.

From the viewpoint of more excellent conductivity, the metal is preferably silver (metallic silver), copper (metallic copper), gold (metallic gold), nickel (metallic nickel), palladium (metallic palladium), or a mixture of two or more of thereof, more preferably silver, copper, or a mixture thereof, and still more preferably silver. The conductive thin wire may contain only silver as a metal, and it is preferable that the metal is entirely constituted of silver. In a case where the metal is entirely constituted of silver, the occurrence of disconnection trouble of the conductive thin wire is reduced.

The metal is present in the conductive thin wire 14 in the form of a particle shape; however, the form of the metal is not limited to this form and may be, for example, a form in which the metal has a layered shape and is dispersed in the conductive thin wire.

Further, the conductive thin wire may contain a polymer. In this case, the metal particles may be discretely present in the polymer, or the metal particles may be aggregated and are present as an aggregate in the polymer. The kind of polymer is not particularly limited, and a known polymer can be used.

Examples of the polymer include a polymer contained in a thin wire which will be described in the description of the manufacturing method for the conductive thin wire described later, and a specific polymer described later is preferable.

The substrate 12 is constituted of, for example, a flexible film. The flexible film is constituted of, for example, polyethylene terephthalate (PET), a cycloolefin polymer (COP), a cycloolefin copolymer (COC), or a polycarbonate (PC).

A line width Wa (see FIG. 2) of the conductive thin wire 14 is the maximum length of the region where the metal 15 of the conductive thin wire 14 is present in the direction DW (see FIG. 2) orthogonal to the direction DL (see FIG. 1) in which the conductive thin wire 14 extends. The line width Wa of the conductive thin wire 14 is preferably 0.1 µm or more and less than 5.0 µm from the viewpoint of the balance between bendability and hardness in visibility. Among the above, the line width Wa is preferably 2.5 µm or less and more preferably 2.0 µm or less from the viewpoint that the conductive thin wire 14 is difficult to be visible. The lower limit thereof is not particularly limited; however, it is preferably 0.5 µm or more and more preferably 1.2 µm or more from the viewpoint that the conductivity of the conductive thin wire is more excellent.

A height T of the conductive thin wire (see FIG. 2) is the maximum length of the region where the metal 15 of the conductive thin wire 14 is present in the direction perpendicular to the surface 12a of the substrate 12. The height T of the conductive thin wire 14 is not particularly limited; however, it is preferably 0.06 µm or more and less than 7.5 µm, and the height T thereof is more preferably 0.3 or more and 3 µm or less, from the viewpoint of the balance between conductivity and bendability.

For the line width Wa of the above-described conductive thin wire 14, five places corresponding to the line width of one conductive thin wire are randomly selected by using a scanning electron microscope, and an arithmetic mean value equivalent to the line widths of the five places is defined as the line width Wa.

Further, for the height T of the above-described conductive thin wire 14, five places corresponding to the height of one conductive thin wire are randomly selected by using a scanning electron microscope, and an arithmetic mean value of the portions corresponding to the heights of the five places is defined as the height T.

In order to secure the conductivity of the conductive thin wire 14, a certain degree of aspect ratio (for example, aspect ratio: 0.3 to 2.5) is required; however, as the aspect ratio becomes small, the surface pressure of the roll becomes hard to be applied, and thus disconnection or the like hardly occurs. It is preferable that in the vertical cross section Ac of the conductive thin wire 14, the ratio of the height T of the conductive thin wire 14 to the line width Wa of the conductive thin wire 14 is 0.6 or more and less than 1.5.

The line resistance value of the conductive thin wire is preferably less than 200 Ω/mm. Among the above, from the viewpoint of operability in a case of being used as a touch panel, it is more preferably less than 100 Ω/mm and still more preferably less than 60 Ω/mm.

The line resistance value is a value obtained by measuring a resistance value by the four point probe method and dividing it by the distance between the measurement terminals. More specifically, after disconnecting both ends of any one conductive thin wire that constitutes a mesh pattern to cut and separate it from the mesh pattern, four (A, B, C, D) microprobes (tungsten probes (diameter: 0.5 μm), manufactured by Micro Support Co., Ltd.) are brought into contact with the cut and separated conductive thin wire, a constant current I is applied to the outermost probes A and D using a source meter (a 2400 type general-purpose source meter, a source meter manufactured by KEITHLEY Instruments) so that a voltage V between the internal probes B and C becomes 5 mV, a resistance value Ri=V/I is measured, and the obtained resistance value Ri is divided by the distance between B and C to determine the line resistance value.

The conductive thin wire may form a predetermined pattern, where the pattern thereof is not particularly limited and is preferably, for example, a geometric shape that is obtained by combining a triangle such as a regular triangle, an isosceles triangle, or a right triangle, a quadrangle such as a square, a rectangle, a rhombus, a parallelogram, or a trapezoid, a (regular) n-polygon such as a (regular) hexagon or a (regular) octagon, a circle, an ellipse, a star shape, and the like, and more preferably a mesh shape (a mesh pattern).

Figure 10:
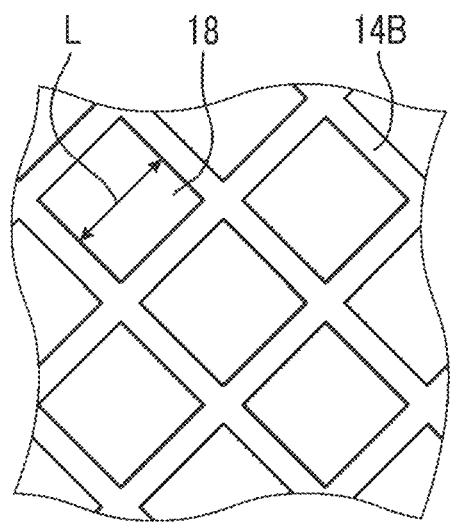
FIG. 10 is a plan view illustrating an example of a mesh pattern formed from conductive thin wires of the conductive substrate according to the embodiment of the present invention.

As illustrated in FIG. 10, the mesh shape is intended to be a shape including a plurality of opening portions (lattices) 18 constituted of intersecting conductive thin wires 14B. The conductive thin wire 14B has the same constitution as the above-described conductive thin wire 14.

In FIG. 10, the opening portion 18 has a rhombus shape (a square shape); however, it may have another shape. For example, the shape may be a polygonal shape (for example, a triangle, a quadrangle, a hexagon, or a random polygonal shape). Further, the shape of one side may be a curved shape or may be a circular arc shape in addition to a straight line shape. In the case of the circular arc shape, for example, two sides facing each other may have a circular arc shape protruding outward, and the other two sides facing each other may have a circular arc shape protruding inward. Further, the shape of each of the sides may be a wavy line shape in which a circular arc protruding outward and a circular arc protruding inward are continuous. Needless to say, the shape of each of the sides may be a sine curve.

Here, FIG. 10 is a plan view illustrating an example of a mesh pattern formed from conductive thin wires of the conductive substrate according to the embodiment of the present invention.

The length L of one side of the opening portion 18 is not particularly limited; however, it is preferably 1,500 μm or less, more preferably 1,300 μm or less, and still more preferably 1,000 μm or less, and it is preferably 5 μm or more, more preferably 30 μm or more, and still more preferably 80 μm or more. In a case where the length of one side of the opening portion is in the above range, it is possible to further maintain good transparency, and in a case where the conductive substrate is attached to the front surface of a display device, it is possible to visually recognize the display without an uncomfortable feeling.

From the viewpoint of visible light transmittance, an opening ratio of the mesh pattern is preferably 90.00% or more, more preferably 95.00% or more, and still more preferably 99.50% or more. The upper limit thereof is not particularly limited; however, it may be less than 100%.

The opening ratio corresponds to a proportion of a region on the substrate, excluding a region where the conductive thin wire is present, to the entire region of the mesh pattern region.

Touch Panel Sensor

Figure 11:
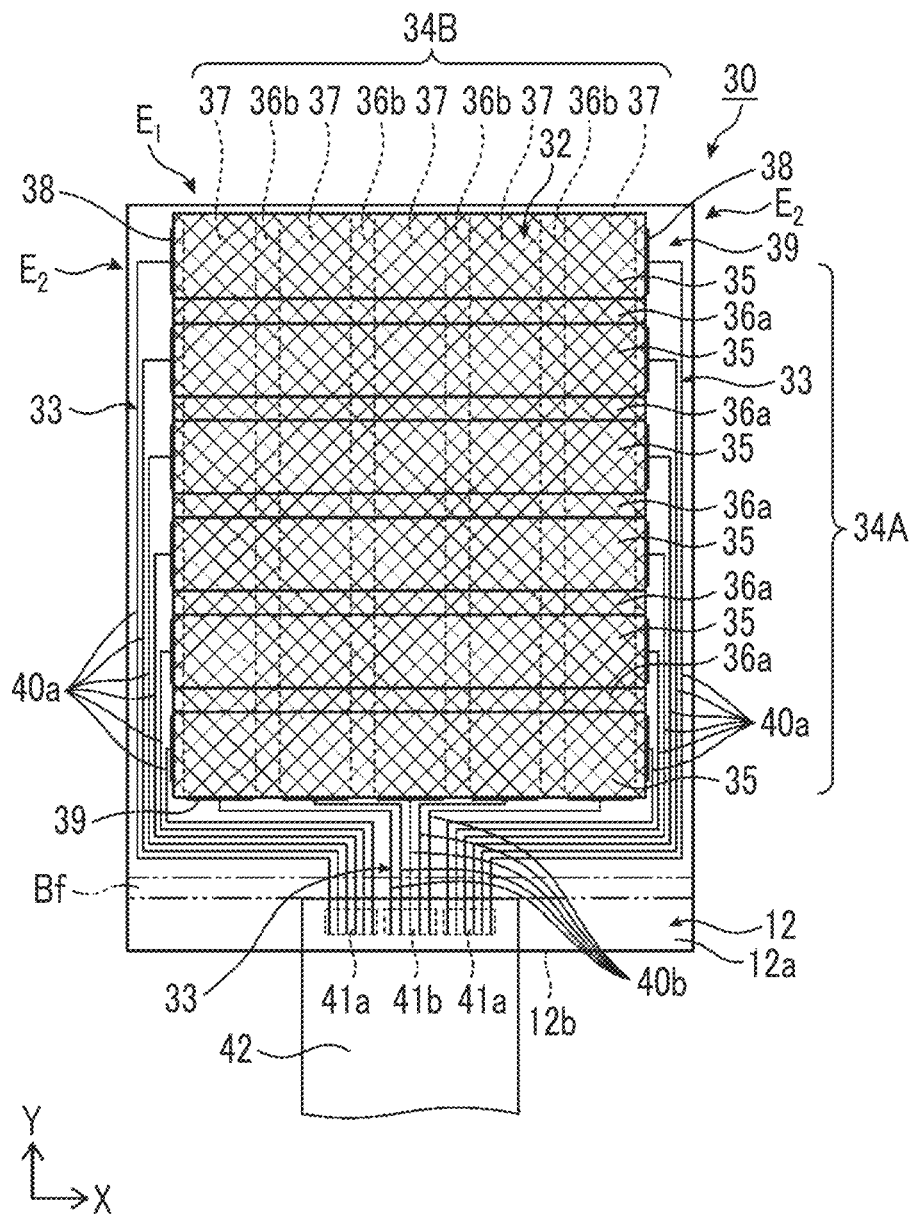
FIG. 11 is a schematic plan view illustrating an example of a touch panel sensor using the conductive substrate according to the embodiment of the present invention.

FIG. 11 is a schematic plan view illustrating an example of a touch panel sensor using the conductive substrate according to the embodiment of the present invention.

A touch panel sensor 30 is a portion that functions as a touch sensor of a touch panel (not illustrated in the drawing), and it has a detection unit 32 that is a detection region $E_1$ where a user can carry out an input operation, and a peripheral wiring part 33 in a peripheral region $E_2$ that is located on the outside of the peripheral area $E_1$.

The detection unit 32 has, for example, a first detection electrode layer 34A and a second detection electrode layer 34B. The first detection electrode layer 34A and the second detection electrode layer 34B are arranged, for example, with the substrate 12 being sandwiched therebetween. The first detection electrode layer 34A and the second detection electrode layer 34B are electrically insulated by the substrate. The substrate functions as an electrical insulating layer.

As illustrated in FIG. 11, the first detection electrode layer 34A has a plurality of the first detection electrodes 35 and a plurality of first dummy electrodes 36a that are arranged between the adjacent first detection electrodes 35 and insulated from the first detection electrodes 35.

The plurality of first detection electrodes 35 are strip-shaped electrodes that extend in the X direction in parallel with each other and are provided on the surface 12a of the substrate 12 in a state of being spaced apart from each other in the Y direction orthogonal to the X direction and being electrically insulated from each other in the Y direction. Further, the plurality of first dummy electrodes 36a are arranged between the first detection electrodes 35 and are provided on the surface 12a of the substrate 12 in a state of being electrically insulated from the first detection electrodes 35. A first electrode terminal 38 is provided at at least one end of each of the first detection electrodes 35 in the X direction.

The second detection electrode layer 34B has a plurality of the second detection electrodes 37 and a plurality of second dummy electrodes 36b that are arranged between the adjacent second detection electrodes 37 and insulated from the second detection electrodes 37. The plurality of second detection electrodes 37 are strip-shaped electrodes that extend in the Y direction in parallel with each other and are provided on a back surface 12b of the substrate 12 in a state of being spaced apart from each other in the X direction and being electrically insulated from each other in the X direction. Further, the plurality of second dummy electrodes 36b are arranged between the second detection electrodes 37 and are provided on the back surface 12b of the substrate 12 in a state of being electrically insulated from the second detection electrodes 37. A second electrode terminal 39 is provided at one end of each of the second detection electrodes 37 in the Y direction.

The plurality of first detection electrodes 35 and the plurality of second detection electrodes 37 are provided orthogonally to each other; however, they are electrically insulated from each other by the substrate 12 as described above.

The first dummy electrode 36a and the second dummy electrode 36b in the first detection electrode 35 and the second detection electrode 37 are separated from the first detection electrode 35 or the second detection electrode 37 by a disconnection portion, and they are regions which are not electrically connected. As a result, as described above, the plurality of first detection electrodes 35 are in a state of being electrically insulated from each other in the Y direction, and the plurality of second detection electrodes 37 are in a state of being electrically insulated from each other in the X direction. As illustrated in FIG. 11, six first detection electrodes 35 and five second detection electrodes 37 are provided in the detection unit 32; however, the numbers thereof are not particularly limited as long as they are plural.

The first detection electrode layer 34A and the second detection electrode layer 34B are constituted of the conductive thin wire 14 (see FIG. 1). In a case where the first detection electrode 35 and the second detection electrode 37 are a metal mesh having a mesh pattern formed by the conductive thin wires 14, the first dummy electrode 36a and the second dummy electrodes 36b are also a metal mesh having a mesh pattern formed by the conductive thin wires 14.

The electrode width of the first detection electrode 35 and the electrode width of the second detection electrode 37 are not particularly limited; however, they are, for example, 1 to 5 mm, and the pitch between the electrodes is 1 to 6 mm. The electrode width of the first detection electrode 35 is the maximum length in the Y direction, and the electrode width of the second detection electrode 37 is the maximum length in the X direction.

The peripheral wiring part 33 is a region where peripheral wires (a first peripheral wire 40a and a second peripheral wire 40b) that are wires for transmitting or transferring a touch drive signal and a touch detection signal from a controller (not illustrated in the drawing) to the first detection electrode 35 and the second detection electrode 37 are arranged. The peripheral wiring part 33 has a plurality of first peripheral wires 40a and a plurality of second peripheral wires 40b. One end of the first peripheral wire 40a is electrically connected to the first detection electrode 35 through the first electrode terminal 38, and the other end thereof is electrically connected to a first external connection terminal 41a. Further, one end of the second peripheral wire 40b is electrically connected to the second detection electrode 37 through the second electrode terminal 39, and the other end thereof is electrically connected to a second external connection terminal 41b.

A flexible circuit board 42 is electrically connected to the first external connection terminal 41a and the second external connection terminal 41b, which are connected to the controller (not illustrated in the drawing).

The first electrode terminal 38 and the second electrode terminal 39 may have a solid film shape or a mesh shape as shown in JP2013-127658A. The preferred range of the widths of the first electrode terminal 38 and the second electrode terminal 39 is 1/3 times or more and 1.2 times or less with respect to each of the electrode widths of the first detection electrode 35 and the second detection electrode 37.

The first detection electrode 35, the first dummy electrode 36a, the first electrode terminal 38, and the first peripheral wire 40a are preferably integrally constituted and still more preferably formed of the same metal material from the viewpoints of the electrical resistance and the hardness in the occurrence of disconnection.

Similarly, the second detection electrode 37, the second dummy electrode 36b, the second electrode terminal 39, and the second peripheral wire 40b are preferably integrally constituted and still more preferably formed of the same metal material from the viewpoints of the electrical resistance and the hardness in the occurrence of disconnection.

Figure 12:
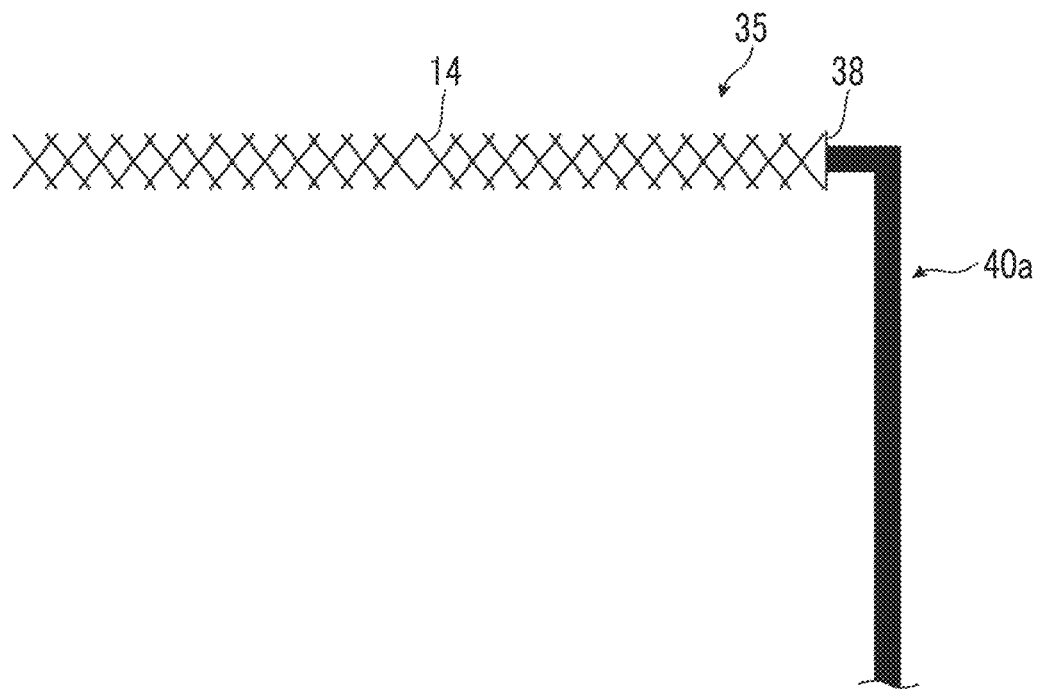
FIG. 12 is a schematic view illustrating a first example of a first peripheral wire of the touch panel sensor using the conductive substrate according to the embodiment of the present invention.
Figure 13:
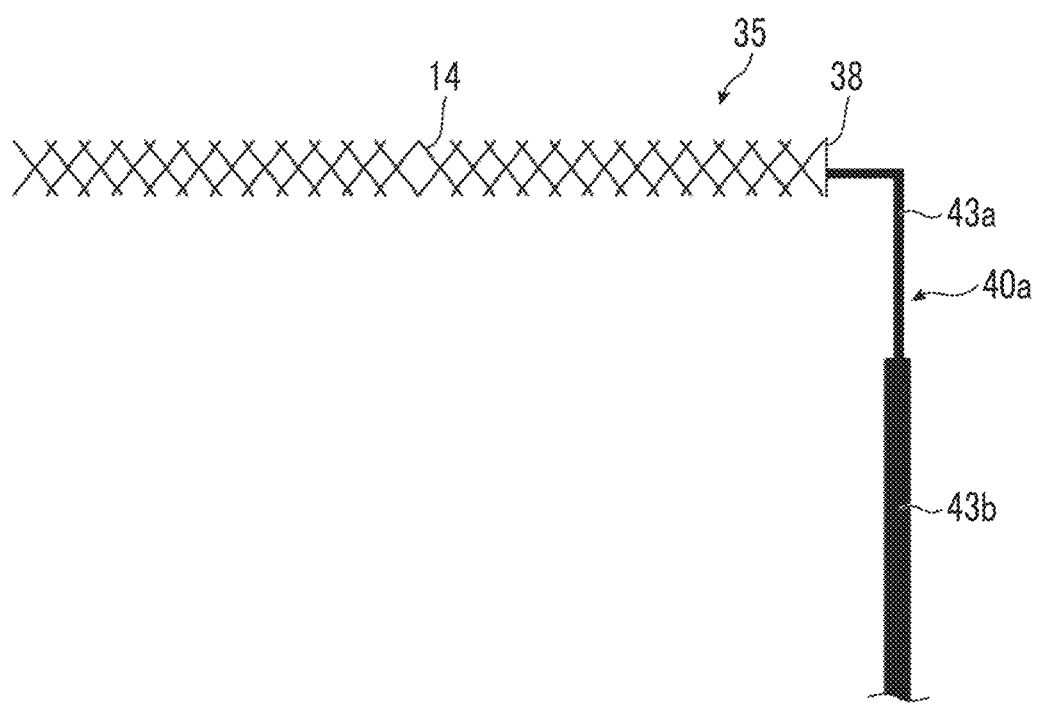
FIG. 13 is a schematic view illustrating a second example of a first peripheral wire of the touch panel sensor using the conductive substrate according to the embodiment of the present invention.
Figure 14:
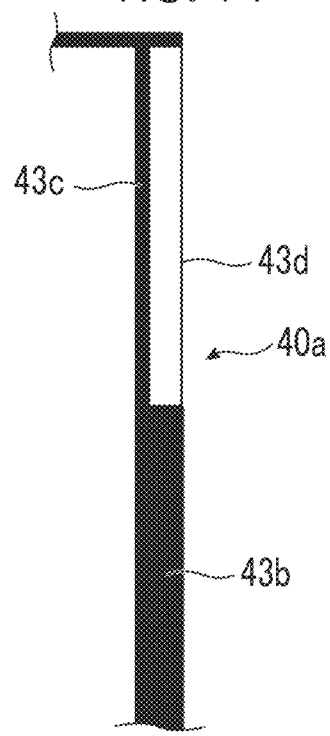
FIG. 14 is a schematic view illustrating a third example of a first peripheral wire of the touch panel sensor using the conductive substrate according to the embodiment of the present invention.
Figure 15:
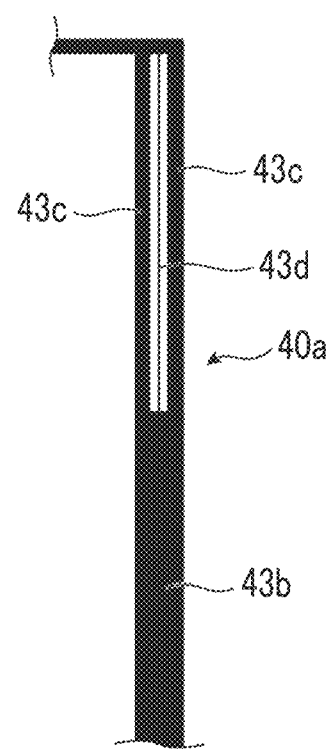
FIG. 15 is a schematic view illustrating a fourth example of a first peripheral wire of the touch panel sensor using the conductive substrate according to the embodiment of the present invention.
Figure 16:
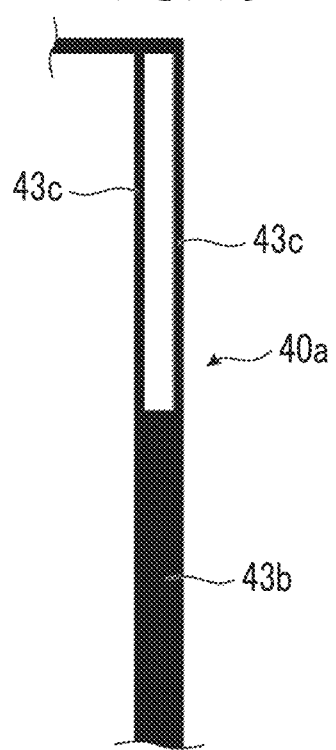
FIG. 16 is a schematic view illustrating a fifth example of a first peripheral wire of the touch panel sensor using the conductive substrate according to the embodiment of the present invention.

FIG. 12 is a schematic view illustrating a first example of a first peripheral wire of the touch panel sensor using the conductive substrate according to the embodiment of the present invention, and FIG. 13 is a schematic view illustrating a second example of a first peripheral wire of the touch panel sensor using the conductive substrate according to the embodiment of the present invention. FIG. 14 is a schematic view illustrating a third example of a first peripheral wire of the touch panel sensor using the conductive substrate according to the embodiment of the present invention, and FIG. 15 is a schematic view illustrating a fourth example of a first peripheral wire of the touch panel sensor using the conductive substrate according to the embodiment of the present invention. FIG. 16 is a schematic view illustrating a fifth example of a first peripheral wire of the touch panel sensor using the conductive substrate according to the embodiment of the present invention.

In FIG. 12 to FIG. 16, the same references are assigned to the same constitution components as the touch panel sensor 30 illustrated in FIG. 11, and the detailed description thereof will be omitted.

As illustrated in FIG. 12, the first peripheral wire 40a has, for example, a constitution in which the line width is the same. That is, the first peripheral wire 40a is constituted to have a constant line width. Further, as illustrated in FIG. 13, the first peripheral wire 40a may have a constitution in which the line width is partially different. In FIG. 13, the first peripheral wire 40a has a first wiring part 43a having a narrow line width and a second wiring part 43b having a line width wider than that of the first wiring part 43a. The first wiring part 43a is connected to the first detection electrode 35.

Further, the first peripheral wire 40a is not limited to being constituted by one wire, and a part thereof may be constituted by a plurality of wires as illustrated in FIGS. 14 to 16. As illustrated in FIG. 14 to FIG. 16, disconnection can be suppressed by the constitution of the first peripheral wire 40a. In the first peripheral wire 40a illustrated in FIG. 14 to FIG. 16, the portion connected to the first detection electrode 35 is constituted of a plurality of wires.

The first peripheral wire 40a illustrated in FIG. 14 has a third wiring part 43c having a line width narrower than that of the second wiring part 43b and a fourth wiring part 43d on the side of the first detection electrode 35 (not illustrated in the drawing). The third wiring part 43c and the fourth wiring part 43d are arranged in parallel. The fourth wiring part 43d has a line width narrower than that of the third wiring part 43c. The fourth wiring part 43d preferably has the same line width as the conductive thin wire 14 since the plating uniformity can be improved and the probability of disconnection can be reduced.

The first peripheral wire 40a illustrated in FIG. 15 has a third wiring part 43c having a line width narrower than that of the second wiring part 43b and a fourth wiring part 43d on the side of the first detection electrode 35 (not illustrated in the drawing). The third wiring parts 43c are arranged on both sides of the fourth wiring part 43d, and a part of the first peripheral wire 40a is constituted of three wiring parts. The fourth wiring part 43d preferably has the same line width as the conductive thin wire 14 since the plating uniformity can be improved and the probability of disconnection can be reduced.

The first peripheral wire 40a illustrated in FIG. 16 has the third wiring part 43c having a line width narrower than that of the second wiring part 43b on the side of the first detection electrode 35 (not illustrated in the drawing). Two third wiring parts 43c are arranged in parallel, and a part of the first peripheral wire 40a is constituted of two wiring parts.

Although the first peripheral wire 40a of the touch panel sensor 30 has been described, the second peripheral wire 40b may have the same constitution as the first peripheral wire 40a.

Figure 17:
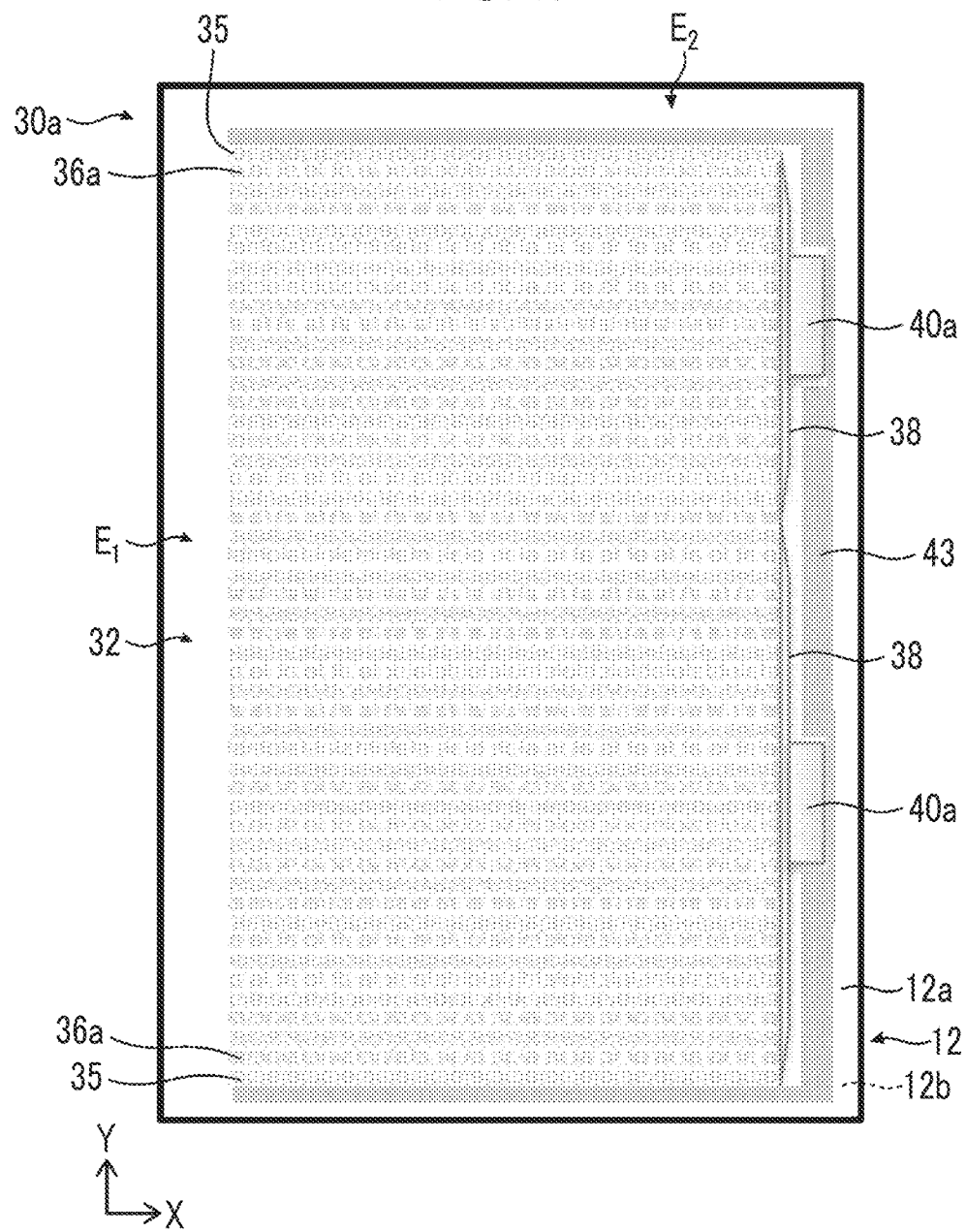
FIG. 17 is a schematic plan view illustrating another example of a touch panel sensor using the conductive substrate according to the embodiment of the present invention.

FIG. 17 is a schematic plan view illustrating another example of a touch panel sensor using the conductive substrate according to the embodiment of the present invention. In FIG. 17, the same references are assigned to the same constitution components as the touch panel sensor 30 illustrated in FIG. 11, and the detailed description thereof will be omitted.

The touch panel sensor 30a illustrated in FIG. 17 is different from the touch panel sensor 30 illustrated in FIG. 11 in terms of having a shield electrode 43; however, the constitution other than this is the same as that of the touch panel sensor 30 illustrated in FIG. 11. The shield electrode 43 is provided on the back surface 12b of the substrate 12 so that it surrounds the detection region $E_1$. The shield electrode 43 is provided on the back surface 12b of the substrate 12 in a region corresponding to the peripheral region $E_2$.

The shield electrode 43 shields the detection unit 32 from electromagnetic waves. The shield electrode 43 suppresses the influence of electromagnetic waves on the detection unit 32. The shield electrode 43 may have a solid film shape, and it may have, for example, a mesh pattern like the first detection electrode 35. Further, the shield electrode 43 can also be used as a ground electrode.

It is preferable that the conductive thin wire contains a large amount of carbon atom, preferably a large amount of polymer, in the metal part. In a case where a polymer is contained, durability, bendability, and handling suitability can be improved. The polymer is preferably gelatin or a polymer or the like different from gelatin described later, and more preferably a water-soluble polymer such as gelatin.

The content of the polymer in the conductive thin wire is preferably 200 mg/m$^2$ or more, more preferably 400 mg/m$^2$ or more, and still more preferably 500 mg/m$^2$ or more per area of the conductive thin wire. In a case where the polymer is, for example, gelatin, the content of the polymer can be quantified by the bicinchoninic acid method (the BCA method) only in the portion where the metal solid film is formed in a range of about 4 cm×4 cm, and in a case of a polymer other than the gelatin, a known method such as an extraction method can be appropriately selected and quantified.

Further, it is preferable that a pattern portion (hereinafter, also simply referred to as a "peripheral pattern") that is located in the peripheral wiring part contains a large amount of polymer as compared with the detection unit using the conductive thin wire, and it is preferable that in the region where the rate of the number of metal atoms inside the peripheral pattern is 50% or more, the ratio of the number of atoms (carbon atom/metal atom) is 0.2 or more.

The ratio of the number of atoms can be calculated by analyzing the atomic composition of the peripheral pattern, with an Ar sputter (2 kV, Ar ion, 2 mm×2 mm) and XPS (X-ray source: Al Kα, Quantera SXM manufactured by ULVAC-PHI, Inc.), in the depth direction from the surface of the conductive thin wire opposite to the substrate.

The inside is defined as a side toward the substrate from the position where the rate of the number of metal atoms is 50% or more, and then the ratio of the number of atoms (carbon atoms/metal atoms) between the carbon atom and the metal atom in the inside region can be determined. As a method of determining the atomic composition, for example, in a case of the conductive thin wire or pattern having a width of 100 μm or more, the above-described sputter and XPS (X-ray photoelectron spectroscopy) method can be used. In a case where the size of the pattern is smaller, for example, 100 μm or less, a cross section of the pattern is obtained, and as a representative value at the center thereof, the atomic composition inside the pattern can be determined by a scanning electron microscope-energy dispersive X-ray spectrometry (SEM-EDX) method.

In addition to the conductive thin wire of the detection unit, a case where there are a peripheral wiring part connected to the detection unit, a ground electrode located outside the detection unit, a shield electrode, and the like is also preferable, where the effect of plating uniformity can be obtained. The peripheral wiring part, the ground wire, the shield electrode, and the like are not particularly limited in the position relative to the detection unit, the constitution, the area, and the like, and they can be preferably adjusted according to the use application of each application. The shapes of the first peripheral wire 40a and the plurality of second peripheral wires 40b can be appropriately selected; however, in the case of the plating method, it is preferable that the line widths of the first peripheral wire 40a and the plurality of second peripheral wires 40b are about the same as the line width of the conductive thin wire 14 in order to improve the plating uniformity.

Further, as illustrated in FIG. 13 described above, the first peripheral wire 40a and the plurality of second peripheral wire 40b also preferably have a constitution in which the first wiring part 43a connected to the first detection electrode 35 is thin. In a case where the line width of the first wiring part 43a is made to be thin, the risk of disconnection increases during handling or processing. For this reason, it is also preferable that a part of the first peripheral wire 40a and the plurality of second peripheral wire 40b is constituted of a plurality of wires as illustrated in FIG. 14 to FIG. 16. In a case of being constituted of a plurality of wires, it is preferable that the line width is made to be equal to that of the conductive thin wire or made to be about the same as the line width of the conductive thin wire in order to improve the plating uniformity.

As illustrated in FIG. 2, the heights of the first peripheral wire 40a and the second peripheral wire 40b can be regulated and measured in the same manner as the conductive thin wire. The height of the peripheral wire is not particularly limited; however, it is preferably 0.06 μm or more and less than 7.5 μm, and more preferably 0.3 or more and 3 μm or less, from the viewpoint of the balance between conductivity and bendability.

As illustrated in FIG. 2, the line widths of the first peripheral wire 40a and the second peripheral wire 40b can be regulated and measured in the same manner as the conductive thin wire. The line width of the peripheral wire is not particularly limited; however, it is preferably large for improving the conductivity, and it is preferably small for narrowing the area of the frame portion of the touch sensor and improving designability. Specifically, it is preferably 1

μm or more and less than 50 μm, more preferably 1.5 μm or more and less than 30 μm, and most preferably 3 μm or more and less than 25 μm.

In a case where the aspect ratio between the first peripheral wire 40a and the second peripheral wire 40b is low to some extent, the surface pressure of the roll becomes hard to be applied, and disconnection or the like hardly occurs. For this reason, in the vertical cross section of the first peripheral wire 40a and the second peripheral wire 40b, the ratio of the height of the peripheral wire to the line width of the peripheral wire is preferably 0.01 or more and less than and still more preferably 0.03 or more and less than 0.6.

Manufacturing Method for Conductive Substrate

Next, a manufacturing method for a conductive substrate will be described.

The manufacturing method for a conductive substrate is not particularly limited as long as the conductive substrate having the above-described constitution can be manufactured; however, from the viewpoint that the above-described conductive substrate having predetermined characteristics can be manufactured with high productivity, it is preferably a manufacturing method having the following steps 1 to 3 in order.

Step 1: A step of forming a thin wire containing a metal on the substrate

Step 2: A step of bringing the thin wire into contact with a solution containing an organic acid Step 3: A step of subjecting the thin wire to a plating treatment to form a conductive thin wire Hereinafter, each of the steps will be described in detail.

Step 1

The step 1 is a step of forming a thin wire containing a metal on the substrate.

Examples of the kind of metal include those exemplified as the metal contained in the above-described conductive thin wire, and silver is preferable.

The metal may have a particle shape, and in such a case, the average particle diameter of the metal particles is preferably 10 to 1,000 nm, more preferably 10 to 200 nm, and still more preferably 50 to 150 nm, in terms of sphere equivalent diameter.

Here, the sphere equivalent diameter is the diameter of spherical particles having the same volume. In addition, the "sphere equivalent diameter" that is used as the average particle diameter of the metal particles is an average value, which is obtained by measuring the sphere equivalent diameters of one hundred objects and arithmetically averaging them.

The shape of the metal particle is not particularly limited, and examples thereof include a spherical shape, a cubic shape, a flat plate shape (a hexagonal flat plate shape, a triangular flat plate shape, a quadrangular flat plate shape, or the like), an octahedron shape, and a tetradecahedron shape.

The metal content in the thin wire is not particularly limited, and it is preferably 3.0 to 20.0 g/m² from the viewpoint that the conductivity of the conductive substrate is more excellent.

The thin wire preferably contains a polymer. That is, in the thin wire, it is preferable that the polymer is used as a binder and the metal is dispersed in the polymer.

The kind of polymer is not particularly limited; however, it is preferably a polymer (hereinafter, also referred to as "specific polymer") different from gelatin from the viewpoint that a conductive thin wire having higher strength can be formed.

The kind of specific polymer is not particularly limited as long as it is different from gelatin, and the specific polymer is preferably a polymer that is not decomposed by a proteolytic enzyme or an oxidizing agent described later which decomposes gelatin.

Examples of the specific polymer include a hydrophobic polymer (a water-insoluble polymer), which includes, for example, at least any one resin selected from the group consisting of a (meth)acrylic resin, a styrene-based resin, a vinyl-based a polyolefin-based resin, a polyester-based resin, a polyurethane-based resin, a polyamide-based resin, a polycarbonate-based resin, a polydiene-based resin, an epoxy-based resin, a silicone-based resin, a cellulose-based polymer, and a chitosan-based polymer, or a copolymer consisting of monomers that constitute these resins.

Further, the specific polymer preferably has a reactive group that reacts with a crosslinking agent described later.

The specific polymer preferably has a particle shape. That is, it is preferable that the photosensitive layer contains particles of the specific polymer.

Among them, the specific polymer is preferably a polymer (a copolymer) represented by General Formula (1) described later.

The content of the polymer in the thin wire is not particularly limited, and it is preferably 0.005 to 2.0 g/m² and more preferably 0.01 to 1.0 g/m² from the viewpoint that at least one of the effect that the electric resistance of the conductive thin wire is lower or the effect that the conductive thin wire is more difficult to visible can be obtained (hereinafter, simply also referred to as "from the viewpoint that the effect of the present invention is more excellent").

The thin wire may form a predetermined pattern, and examples thereof include a pattern which is capable of being formed by the conductive thin wire described above.

The description of the substrate is as described above.

A method of forming, on a substrate, a thin wire containing a metal is not particularly limited, and a known method is adopted. Examples thereof include a method of carrying out exposure and development using a silver halide, a method of forming a metal-containing layer on the entire surface of a substrate, and then removing a part of the layer using a resist pattern to firm the thin wire, and a method of ejecting a composition containing metal particles and a polymer onto a base material by a known printing method such as inkjet to term thin wire.

Among them, a method of carrying out exposure and development using a silver halide is preferable from the viewpoint that the effect of the present invention is more excellent.

Hereinafter, this method will be described in detail.

The method of carrying out exposure and development using a silver halide preferably has the following steps.

Step A: A step of forming, on a substrate, a silver halide-containing photosensitive layer containing a silver halide, gelatin, and a specific polymer Step B: A step of exposing the silver halide-containing photosensitive layer and then subjecting it to a development treatment to form a thin wire-shaped silver-containing layer containing metallic silver, gelatin, and a polymer different from the gelatin Step C: A step of subjecting the silver-containing layer obtained in the step B to a heating treatment Step D: A step of removing gelatin in the silver-containing layer obtained in the step C to form the thin wire Hereinafter, the procedure of each step will be described in detail.

Step A

The step A is a step of forming, on a substrate, a silver halide-containing photosensitive layer (hereinafter, also referred to as a "photosensitive layer") containing a silver halide, gelatin, and a specific polymer. By this step, a substrate having a photosensitive layer that is subjected to an exposure treatment described later is manufactured.

First, a material and a substrate, which are used in the step A, will be described in detail, and then the procedure of the step A will be described in detail.

Silver Halide

A halogen atom contained in the silver halide may be any one of a chlorine atom, a bromine atom, an iodine atom, or a fluorine atom, and a combination thereof may be contained. For example, a silver halide mainly composed of silver chloride, silver bromide, or silver iodide is preferable, and a silver halide mainly composed of silver chloride or silver bromide is more preferable. It is noted that silver chlorobromide, silver iodochlorobromide, or silver iodobromide is also preferably used.

Here, for example, the "silver halide mainly composed of silver chloride" means a silver halide in which the molar fraction of ions of chlorides to the total ions of halides in the silver halide composition is 50% or more. This silver halide mainly composed of silver chloride may contain a bromide ion and/or an iodide ion in addition to the chloride ion.

The silver halide generally has a solid particle shape, and the average particle diameter of the silver halide is preferably 10 to 1,000 nm, more preferably 10 to 200 nm, and still more preferably 50 to 150 nm, in terms of sphere equivalent diameter.

The shape of the particle of the silver halide is not particularly limited, and examples thereof include a spherical shape, a cubic shape, a flat plate shape (a hexagonal flat plate shape, a triangular flat plate shape, a quadrangular flat plate shape, or the like), an octahedron shape, and a tetradecahedron shape.

Gelatin

The kind of gelatin is not particularly limited, and examples thereof include lime-treated gelatin and acid-treated gelatin. Further, a hydrolyzate of gelatin, an enzymatic decomposition product of gelatin, or gelatin modified with an amino group and/or a carboxyl group (phthalated gelatin or acetylated gelatin) may be used.

Specific Polymer

The photosensitive layer contains a polymer (a specific polymer) different from gelatin. Since this specific polymer is contained in the photosensitive layer, the strength of the silver-containing layer and the conductive thin wire, which are formed from the photosensitive layer, is more excellent.

The kind, the specific example, and the characteristics of the specific polymer, such as the shape, are as described above.

Among the above, the specific polymer is preferably a polymer (a copolymer) represented by General Formula (1) below.

$$-(A)_x-(B)_y-(C)_z-(D)_w- \quad \text{General Formula (1)}$$

In General Formula (1), A, B, C, and D respectively represent repeating units represented by General Formulae (A) to (D).

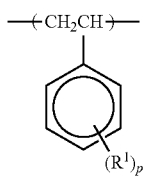

A

-continued

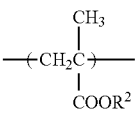

B

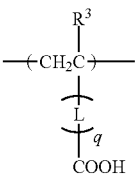

C

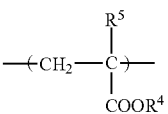

D $R^1$ represents a methyl group or a halogen atom, and it is preferably a methyl group, a chlorine atom, or a bromine atom. p represents an integer of 0 to 2, and it is preferably 0 or 1 and more preferably 0.

$R^2$ represents a methyl group or an ethyl group, and it is preferably a methyl group.

$R^3$ represents a hydrogen atom or a methyl group, and it is preferably a hydrogen atom. L represents a divalent linking group, and it is preferably a group represented by General Formula (2).

$$-(CO-X^1)_r-X^2- \quad \text{General Formula (2)}$$

In General Formula (2), $X^1$ represents an oxygen atom or $NR^{30}$—. Here, $R^{30}$ represents a hydrogen atom, an alkyl group, an aryl group, or an acyl group, each of which may have a substituent (for example, a halogen atom, a nitro group, or a hydroxyl group). $R^{30}$ is preferably a hydrogen atom, an alkyl group having 1 to 10 carbon atoms (for example, a methyl group, an ethyl group, an n-butyl group, or an n-octyl group), or an acyl group (for example, an acetyl group or a benzoyl group). $X^1$ is preferably an oxygen atom or —NH—.

$X^2$ represents an alkylene group, an arylene group, an alkylene arylene group, an arylene alkylene group, or an alkylene arylene alkylene group, and in the middle of these groups, —O—, —S—, —CO—, —COO—, —NH—, —SO$_2$—, —N(R$^{31}$)—, or —N(R$^{31}$)SO$_2$— may be inserted. $R^{31}$ represents a linear or branched alkyl group having 1 to 6 carbon atoms. $X^2$ is preferably a dimethylene group, a trimethylene group, a tetramethylene group, an o-phenylene group, an m-phenylene group, a p-phenylene group, —CH$_2$CH$_2$OCOCH$_2$CH$_2$—, or —CH$_2$CH$_2$OCO(C$_6$H$_4$)—.

r represents 0 or 1.

q represents 0 or 1, and it is preferably 0.

$R^4$ represents an alkyl group, an alkenyl group, or an alkynyl group, and it is preferably an alkyl group having 5 to 50 carbon atoms, more preferably an alkyl group having 5 to 30 carbon atoms, and still more preferably an alkyl group having 5 to 20 carbon atoms.

$R^5$ represents a hydrogen atom, a methyl group, an ethyl group, a halogen atom, or —CH$_2$COOR$^6$, and it is preferably a hydrogen atom, a methyl group, a halogen atom, or —CH$_2$COOR$^6$, more preferably a hydrogen atom, a methyl group, or —CH$_2$COOR$^6$, and still more preferably a hydrogen atom.

$R^6$ represents a hydrogen atom or an alkyl group having 1 to 80 carbon atoms and may be the same as or different from $R^4$. $R^6$ preferably has 1 to 70 carbon atoms and more preferably 1 to 60 carbon atoms.

In General Formula (1), x, y, z, and w represent a molar ratio of each repeating unit.

x is 3% to 60% by mole, and it is preferably 3% to 50% by mole and more preferably 3% to 40% by mole.

y is 30% to 96% by mole, and it is preferably 35% to 95% by mole and more preferably 40% to 90% by mole.

z is 0.5% to 25% by mole, and it is preferably 0.5% to 20% by mole and more preferably 1% to 20% by mole.

w is 0.5% to 40% by mole, and it is preferably 0.5% to 30% by mole.

In General Formula (1), a preferred case is a case where x is 3% to 40% by mole, y is 40% to 90% by mole, z is 0.5% to 20% by mole, and w is 0.5% to 10% by mole.

The polymer represented by General Formula (1) is preferably a polymer represented by General Formula (2).

General Formula (2)

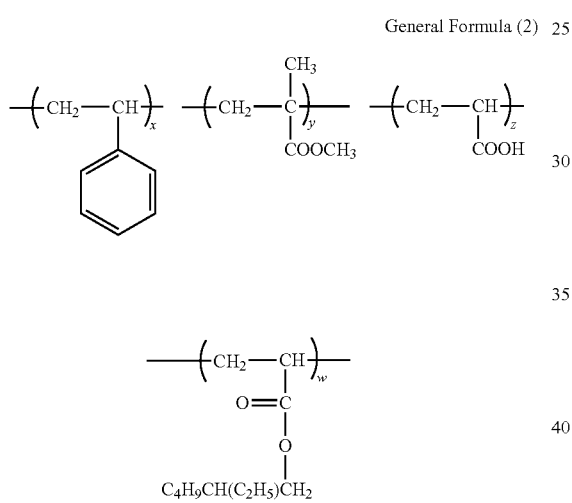

In General Formula (2), x, y, z, and w are as defined above.

The polymer represented by General Formula (1) may contain a repeating unit other than the repeating units represented by General Formulae (A) to (D).

Examples of the monomers for forming other repeating units include acrylic acid esters, methacrylic acid esters, vinyl esters, olefins, crotonic acid esters, itaconic acid diesters, maleic acid diesters, fumaric acid diesters, acrylamides, unsaturated carboxylic acids, allyl compounds, vinyl ethers, vinyl ketones, vinyl heterocyclic compounds, glycidyl esters, and unsaturated nitriles. These monomers are also described in paragraphs 0010 to 0022 of JP3754745B. From the viewpoint of hydrophobicity, acrylic acid esters or methacrylic acid esters are preferable, and a hydroxyalkyl methacrylate or a hydroxyalkyl acrylate is more preferable.

The polymer represented by General Formula (1) preferably contains a repeating unit represented by General Formula (E).

E

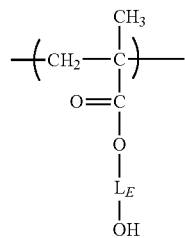

In the above formula, $L_E$ represents an alkylene group, and it is preferably an alkylene group having 1 to 10 carbon atoms, more preferably an alkylene group having 2 to 6 carbon atoms, and still more preferably an alkylene group having 2 to 4 carbon atoms.

The polymer represented by General Formula (1) is particularly preferably a polymer represented by General Formula (3).

General Formula (3)

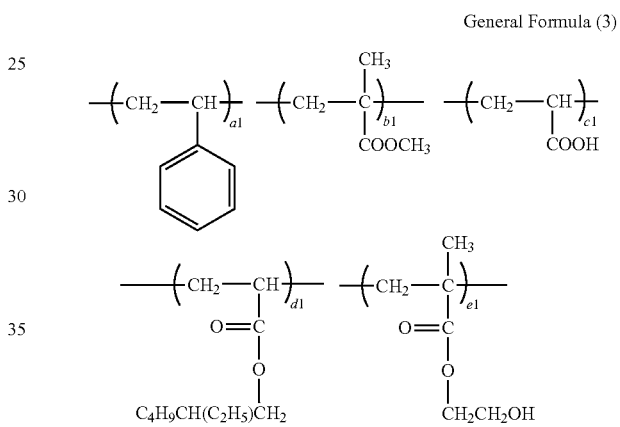

In the above formula, a1, b1, c1, d1, and e1 represent the molar ratio of each repeating unit, a1 represents 3 to 60 (% by mole), b1 represents 30 to 95 (% by mole), c1 represents 0.5 to 25 (% by mole), d1 represents 0.5 to 40 (% by mole), and e1 represents 1 to 10 (% by mole).

The preferred range of a1 is the same as the preferred range of the x, the preferred range of b1 is the same as the preferred range of the y, the preferred range of c1 is the same as the preferred range of the z, and the preferred range of d1 is the same as the preferred range of the w.

e1 is 1% to 10% by mole, and it is preferably 2% to 9% by mole and more preferably 2% to 8% by mole.

The specific polymer can be synthesized with reference to, for example, JP3305459B and JP3754745B.

The weight-average molecular weight of the specific polymer is not particularly limited, and it is preferably 1,000 to 1,000,000, more preferably 2,000 to 750,000, and still more preferably 3,000 to 500,000.

The photosensitive layer may contain other materials other than the above-described material, as necessary.

Examples of the other materials include metal compounds belonging to Groups 8 and 9, such as a rhodium compound and an iridium compound that are used for stabilizing the silver halide and increasing the sensitivity of the silver halide. In addition, examples of the other materials include an antistatic agent, a nucleation accelerator, a spectral sensitizing dye, a surfactant, an antifogging agent, a film hardening agent, a black pepper spot preventing agent, a redox compound, a monomethine compound, and dihydroxybenzenes as described in paragraphs 0220 to 0241 of JP2009-004348A.

Further, examples of the other materials also include a viscosity-adjusting agent (for example, thickening polysaccharides, celluloses, water-soluble polymers, or the like), a film-forming auxiliary agent (for example, a diol compound such as a glycol derivative or 2,2,4-trimethyl-1,3-pentanediol monoisobutyrate), a preservative, a plasticizer, a slipping agent, fillers consisting of an organic, inorganic, or organic and inorganic composite material (for example, poly methyl methacrylate (PMMA), polystyrene, colloidal silica, zirconia, cellulose, nanofiber, and carbon nanotube (CNT)), and an ultraviolet absorbing agent.

The antistatic agent is preferable since it can prevent the adhesion of foreign substances due to the electrification of the silver halide-containing photosensitive material or the trouble due to unintended photosensitization due to the discharge light emission. The surfactant is preferable since it can control the coatability of the photosensitive layer, the adhesiveness to the substrate, and the dispersibility of the silver halide and the binder as well as other contained components.

In addition, the photosensitive layer may contain the crosslinking agent or curing agent described in paragraphs 0146 to 0158, the dye described in paragraphs 0160 to 0170, and the water-soluble binder described in paragraphs 0214 to 0217 of JP2009-004348A. Further, the photosensitive layer may contain the metal stabilizer described in paragraphs 0079 to 0081 and the specific compound described in paragraphs 0109 to 0118 of WO2020/195622A. In addition, the photosensitive layer may contain physical developing nuclei.

Furthermore, the photosensitive layer may contain a crosslinking agent that is used for crosslinking the specific polymers to each other. In a case where a crosslinking agent is contained, the crosslinking between the specific polymers proceeds, and thus the connection between the metallic silver in the conductive thin wire is maintained even in a case where gelatin is decomposed and removed. These materials other than the gelatin and the specific polymer may be contained in the silver halide-free layer and/or the protective layer described later.

Procedure of Step A

A method of forming a photosensitive layer in the step A, which contains the above-described components, is not particularly limited; however, from the viewpoint of productivity, it is preferably a method of bringing a composition for forming a photosensitive layer, containing a silver halide, gelatin, and the specific polymer, into contact with the surface of a substrate and forming a photosensitive layer on the substrate.

Hereinafter, a form of the composition for forming a photosensitive layer that is used in this method will be described in detail, and then the procedure of the steps will be described in detail.

Material Contained in Composition for Forming Photosensitive Layer

The composition for forming a photosensitive layer contains the above-described silver halide, gelatin, and specific polymer. It is noted that, as necessary, the specific polymer may be contained in the composition for forming a photosensitive layer in the form of a particle shape.

The composition for forming a photosensitive layer may contain a solvent, as necessary.

Examples of the solvent include water, organic solvents (for example, alcohols, ketones, amides, sulfoxides, esters, and ethers), ionic liquids, and mixed solvents thereof.

A method of bringing the composition for forming a photosensitive layer into contact with a substrate is not particularly limited, and examples thereof include a method of applying the composition for forming a photosensitive layer onto a substrate and a method of immersing a substrate in the composition for forming a photosensitive layer.

After the above-described treatment, a drying treatment may be carried out as necessary.

Silver Halide-Containing Photosensitive Layer

The photosensitive layer formed according to the above procedure contains a silver halide, gelatin, and the specific polymer.

The content of the silver halide in the photosensitive layer is not particularly limited and, from the viewpoint that the effect of the present invention is more excellent, it is preferably 3.0 to 20.0 $g/m^2$ and more preferably 5.0 to 15.0 $g/m^2$ in terms of silver.

"In terms of silver" means that all the silver halide is converted into the mass of silver to be generated by reducing all the silver halide.

The content of the specific polymer in the photosensitive layer is not particularly limited and, from the viewpoint that the effect of the present invention is more excellent, it is preferably 0.04 to 2.0 $g/m^2$ and more preferably 0.08 to 0.40 $g/m^2$.

Step B

The step B is a step of exposing the photosensitive layer and then subjecting it to a development treatment to form a thin wire-shaped silver-containing layer containing metallic silver, gelatin, and a specific polymer.

In a case where the photosensitive layer is subjected to an exposure treatment, a latent image is formed in the exposed region.

The exposure may be carried out in a patterned manner. In order to obtain a mesh pattern consisting of a conductive thin wire, which will be described later, examples of the exposure method include a method of carrying out exposure through a mask having a mesh-shaped opening pattern and a method of carrying out exposure in a mesh shape by carrying out scanning using laser light.

The kind of light that is used for exposure is not particularly limited as long as a latent image can be formed on the silver halide, and examples thereof include visible light, ultraviolet rays, and X-rays.

In a case where exposure is carried out through a mask having an opening pattern, the exposure amount may be reduced and only a specific place in the mask opening pattern may be exposed to adjust the amount of latent image formation. In a case where the amount of latent image formation is adjusted, it is possible to adjust the amount of metal and the thickness (the height) which are formed in the subsequent operation. The means for reducing the exposure amount only in the specific place is not particularly limited, and examples thereof include a method of adjusting the exposure amount from a light source, with which the specific portion is irradiated. For example, it includes such a method as reducing the exposure amount by reducing the output of only the lamp and LED above the portion of interest or installing a dimming filter above the specific portion. Further, examples of another means for reducing the exposure amount only in the specific place include a method using a halftone mask in which a semi-transmissive film is applied to a specific portion of the mask opening pattern. From the viewpoint of productivity, it is preferable to use a halftone mask.

In a case where the exposed photosensitive layer is subjected to a development treatment, metallic silver is precipitated in the exposed region (the region where a latent image is formed).

The method of the development treatment is not particularly limited and examples thereof include known methods that are used for a silver salt photographic film, photographic printing paper, a printing plate making film, and an emulsion mask for a photomask.

In the development treatment, a developer is generally used. The kind of developer is not particularly limited, and examples thereof include a phenidone hydroquinone (PQ) developer, a metol hydroquinone (MQ) developer, and a metol/ascorbic acid (MAA) developer.

This step may further include a fixing treatment that is carried out for the purpose of removing and stabilizing the silver halide of unexposed portions.

The fixing treatment is carried out simultaneously with development and/or after development. The method of the fixing treatment is not particularly limited, and examples thereof include methods that are used for a silver salt photographic film, photographic printing paper, a printing plate making film, and an emulsion mask for a photomask.

In the fixing treatment, a fixing liquid is generally used. The kind of fixing liquid is not particularly limited, and examples thereof include the fixing liquid described in "Chemistry of Photographs" (written by Sasai, Photo Industry Publishing Co., Ltd.) p 321.

In a case where the above-described treatment is carried out, a thin wire-shaped silver-containing layer containing metallic silver, gelatin, and the specific polymer is formed.

Examples of the method of adjusting the line width of the silver-containing layer include a method of adjusting the opening width of a mask that is used at the time of exposure.

Further, in a case where a mask is used at the time of exposure, the width of the silver-containing layer to be formed can be adjusted by adjusting the exposure amount. For example, in a case where the opening width of the mask is narrower than the target width of the silver-containing layer, the width of the region where a latent image is formed can be adjusted by increasing the exposure amount more than usual.

Further, in a case where laser light is used, the exposed region can be adjusted by adjusting the focusing range and/or the scanning range of the laser light.

In order to adjust the ratio of the number of atoms (carbon atom/metal atom) inside the region where the rate of the number of metal atoms inside the peripheral pattern is 50% or more, a method of adjusting the size of the peripheral pattern with respect to the detection electrode can be mentioned. In a case where the size of the peripheral pattern with respect to the detection electrode is large, it becomes difficult to remove gelatin from the peripheral pattern in the step D described later, and as a result, a peripheral pattern having a high rate of the carbon atom can be formed.

Step C

The step C is a step of subjecting the silver-containing layer obtained in the step B to a heating treatment. In a case where this step is carried out, fusion welding between specific polymers in the silver-containing layer progresses, and thus the strength of the silver-containing layer is improved.

The method of the heating treatment is not particularly limited, and examples thereof include a method of bringing the silver-containing layer into contact with superheated vapor and a method of heating the silver-containing layer with a temperature control device (for example, a heater), and a method of bringing the silver-containing layer into contact with superheated vapor is preferable.

The superheated vapor may be superheated steam or may be a mixture obtained by mixing superheated steam with another gas.

The time of contact between the superheated vapor and the silver-containing layer is not particularly limited, and it is preferably 10 to 70 seconds.

The supply amount of the superheated vapor is preferably 500 to 600 $g/m^3$, and the temperature of the superheated vapor is preferably 100° C. to 160° C. (preferably 100° C. to 120° C.) at 1 atm.

As the heating conditions in the method of heating the silver-containing layer with a temperature control device, conditions of heating at 100° C. to 200° C. (preferably 100° C. to 150° C.) for 1 to 240 minutes (preferably 60 to 150 minutes) are preferable.

Step D

The step D is a step of removing gelatin in the silver-containing layer obtained in the step C to form the thin wire. In a case where this step is carried out, gelatin is removed from the silver-containing layer, and the thin wire having voids formed inside thereof is formed. A plating liquid described later infiltrates into these voids, and metal plating is formed.

In a case where gelatin is removed, all of the gelatin in the silver-containing layer may be removed, or the gelatin may be removed so that a part thereof remains. Among the above, it is preferable to carry out the step D so that a part of the gelatin remains from the viewpoint that the effect of the present invention is more excellent.

The method of removing gelatin is not particularly limited, and examples thereof include a method of using a proteolytic enzyme (hereinafter, also referred to as a "method 1") and a method of decomposing and removing gelatin using an oxidizing agent (hereinafter, also referred to as a "method 2").

Examples of the proteolytic enzyme that is used in the method 1 include enzymes known as vegetable or animal enzymes that are capable of hydrolyzing proteins such as gelatin.

Examples of the proteolytic enzyme include pepsin, rennin, trypsin, chymotrypsin, cathepsin, papain, ficin, thrombin, renin, collagenase, bromelain, and a bacterial protease, and trypsin, papain, ficin, or a bacterial protease is preferable.

A method of bringing the silver-containing layer into contact with the above-described proteolytic enzyme suffices as the procedure in the method 1, and examples thereof include a method of bringing the silver-containing layer into contact with a treatment liquid (hereinafter, also referred to as an "enzyme solution") containing a proteolytic enzyme. Examples of the contact method include a method of immersing the silver-containing layer in the enzyme solution and a method of applying the enzyme solution onto the silver-containing layer.

The content of the proteolytic enzyme in the enzyme solution is not particularly limited, and it is preferably 0.05% to 20% by mass and more preferably 0.5% to 10% by mass with respect to the total amount of the enzyme solution from the viewpoint that degree of decomposition and removal of the gelatin is easily controlled.

The enzyme solution generally contains water in addition to the above-described proteolytic enzyme.

As necessary, the enzyme solution may contain other additives (for example, a pH buffering agent, an antibacterial compound, a wetting agent, and a preservative).

The pH of the enzyme solution is selected so that the action of the enzyme can be obtained to the maximum; however, in general, it is preferably 5 to 9.

The temperature of the enzyme solution is preferably a temperature at which the action of the enzyme is enhanced, specifically, 20° C. to 45° C.

As necessary, a washing treatment in which the obtained silver-containing layer is washed with warm water after the treatment with the enzyme solution may be carried out.

The washing method is not particularly limited, and a method of bringing the silver-containing layer into contact with warm water is preferable. Examples thereof include a method of immersing the silver-containing layer in warm water and a method of applying warm water onto the silver-containing layer.

Regarding the temperature of the warm water, an optimum temperature is appropriately selected according to the kind of proteolytic enzyme to be used, and it is preferably 20° C. to 80° C. and more preferably 40° C. to 60° C. from the viewpoint of productivity.

The time (the washing time) of contact between the warm water and the silver-containing layer is not particularly limited, and it is preferably 1 to 600 seconds and more preferably 10 to 180 seconds from the viewpoint of productivity.

The oxidizing agent that is used in the method 2 may be any oxidizing agent capable of decomposing gelatin, and an oxidizing agent having a standard electrode potential of +1.5 V or higher is preferable. Here, the standard electrode potential is intended to be a standard electrode potential (25° C., E0) of the oxidizing agent with respect to the standard hydrogen electrode in the aqueous solution.

Examples of the oxidizing agent include persulfuric acid, percarbonic acid, perphosphoric acid, peroxomonoperchloric acid, peracetic acid, metachloroperbenzoic acid, hydrogen peroxide water, perchloric acid, periodic acid, potassium permanganate, ammonium persulfate, ozone, and hypochlorous acid; however, from the viewpoint of productivity and economy, it is preferably hydrogen peroxide water (standard electrode potential: 1.76 V) or hypochlorous acid or a salt thereof, and more preferably sodium hypochlorite.

A method of bringing the silver-containing layer into contact with the above-described oxidizing agent suffices as the procedure in the method 2, and examples thereof include a method of bringing the silver-containing layer into contact with a treatment liquid (hereinafter, also referred to as an "oxidizing agent solution") containing an oxidizing agent. Examples of the contact method include a method of immersing the silver-containing layer in the oxidizing agent solution and a method of applying the oxidizing agent solution onto the silver-containing layer.

The kind of solvent contained in the oxidizing agent solution is not particularly limited, and examples thereof include water and an organic solvent.

Step F

The step 1 may have a step E of forming a silver halide-free layer containing gelatin and the specific polymer on the substrate before the step A. In a case where this step is carried out, a silver halide-free layer is formed between the substrate and the silver halide-containing photosensitive layer. This silver halide-free layer serves as a so-called antihalation layer and contributes to improving the adhesiveness between the conductive thin wire and the substrate.

The silver halide-free layer contains the above-described gelatin and specific polymer. On the other hand, the silver halide-free layer does not contain a silver halide.

The ratio of the mass of the specific polymer to the mass of the gelatin (the mass of the specific polymer/the mass of the gelatin) in the silver halide-free layer is not particularly limited, and it is preferably 1.0 to 5.0 and more preferably 0 to 3.0.

The content of the specific polymer in the silver halide-free layer is not particularly limited. It is 0.03 $g/m^2$ or more in a large number of cases, and it is preferably 1.0 $g/m^2$ or more from the viewpoint that the adhesiveness of the conductive thin wire is more excellent. The upper limit thereof is not particularly limited and is 1.63 $g/m^2$ or less in a large number of cases.

A method of forming the silver halide-free layer is not particularly limited, and examples thereof include a method of applying a composition for forming a layer, containing gelatin and the specific polymer, onto a substrate and carrying out a heating treatment as necessary.

For example, the composition for forming a layer may contain a solvent as necessary. Examples of the kind of solvent include the solvent that is used in the above-described composition for forming a photosensitive layer.

The thickness of the silver halide-free layer is not particularly limited. It is 0.05 μm or more in a large number of cases, and it is preferably more than 1.0 μm and more preferably 1.5 μm or more from the viewpoint that the adhesiveness of the conductive thin wire is more excellent. The upper limit thereof is not particularly limited; however, it is preferably less than 3.0 μm.

Step F

The step 1 may have a step F of forming a protective layer containing gelatin and the specific polymer on the silver halide-containing photosensitive layer after the step A and before the step B. In a case where a protective layer is provided, it is possible to prevent scratches on the photosensitive layer and improve the mechanical characteristics.

The ratio of the mass of the specific polymer to the mass of the gelatin (the mass of the specific polymer/the mass of the gelatin) in the protective layer is not particularly limited, and it is preferably more than 0 and 2.0 or less, and more preferably more than 0 and 1.0 or less.

Further, the content of the specific polymer in the protective layer is not particularly limited, and it is preferably more than 0 $g/m^2$ and 0.3 $g/m^2$ or less, and more preferably 0.005 to 0.1 $g/m^2$.

A method of forming the protective layer is not particularly limited, and examples thereof include a method of applying a composition for forming a protective layer, containing gelatin and the specific polymer, onto the silver halide-containing photosensitive layer and carrying out a heating treatment as necessary.

For example, the composition for forming a protective layer may contain a solvent as necessary. Examples of the kind of solvent include the solvent that is used in the above-described composition for forming a photosensitive layer.

The thickness of the protective layer is not particularly limited, and it is preferably 0.03 to 0.3 μm and more preferably 0.075 to 0.20 μm.

The above-described step E, step A, and step F may be simultaneously carried out by simultaneous multilayer coating.

Step 2

The step 2 is a step of bringing the thin wire into contact with a solution containing an organic acid. In a case where this step is carried out, the organic acid adheres to the surface of the thin wire and suppresses the plating precipitation on the surface of the thin wire during the plating treatment of the step 3 described later, whereby it becomes easier for the plating liquid to permeate into the inside of the thin wire. As a result, the metal (the plated metal) is easily precipitated in the inside of the thin wire, and thus a desired effect can be obtained.

Hereinafter, first, a solution that is used in this step will be described in detail, and then the procedure of the step 2 will be described in detail.

Solution Containing Organic Acid

The kind of the organic acid contained in the solution containing the organic acid (hereinafter, also simply referred to as a "first solution") is not particularly limited as long as the organic acid contains carbon atoms, and examples thereof include a carboxylic acid (an organic compound having a carboxy group), a sulfonic acid (an organic compound having a sulfonate group), and phosphoric acid (an organic compound having a phosphonate group). Among them, a carboxylic acid is preferable from the viewpoint that the effect of the present invention is more excellent.

The weight-average molecular weight of the organic acid (for example, a carboxylic acid) is not particularly limited; however, it is preferably 60 to 400 and more preferably 90 to 300 from the viewpoint that the effect of the present invention is more excellent.

The carboxylic acid may be a monovalent carboxylic acid or may be a divalent or higher-valent (polyvalent) carboxylic acid, and it is preferably a polyvalent carboxylic acid from the viewpoint that the effect of the present invention is more excellent. The divalent or higher-valent carboxylic acid is preferably a divalent to heptavalent carboxylic acid, and more preferably a divalent to tetravalent carboxylic acid.

Here, the valence represents the number of carboxy groups contained, and the monovalent carboxylic acid is a compound having one carboxy group.

The carboxylic acid may have a polar group (for example, a hydroxy group, an amino group, a carbonyl group, or an ether group) in addition to the carboxy group.

Examples of the carboxylic acid include monovalent carboxylic acids such as acetic acid, lactic acid, and hydroxybutyric acid, divalent carboxylic acid such as oxalic acid, malonic acid, tartaric acid, L-aspartic acid, DL-malic acid, oxaloacetic acid, succinic acid, glutamic acid, and 2-oxoglutaric acid, adipic acid, and pimellic acid, trivalent carboxylic acids such as citric acid, 1,2,3-propanetricarboxylic acid, and 1,3,5-pentatricarboxylic acid, tetracarboxylic acid such as 1,2,3,4-butane tetracarboxylic acid, ethylenediamine tetraacetic acid, and ethyleneglycol bis(β-aminoethyl ether)-N,N,N,N-tetraacetic acid, and pentavalent carboxylic acids such as diethylenetriamine pentaacetic acid.

The first solution contains a solvent. The kind of solvent is not particularly limited, and examples of the solvent include water, organic solvents (for example, alcohols, ketones, amides, sulfoxides, esters, and ethers), ionic liquids, and mixed solvents thereof. Among them, water is preferable.

The first solution may contain other components in addition to the organic acid and the solvent.

Examples of the other components include quaternary ammonium salts contained in the second solution described later. The aspect of the quaternary ammonium salt will be described in detail later.

The content of the organic acid in the first solution is not particularly limited; however, from the viewpoint that the effect of the present invention is more excellent, it is preferably 0.2% to 5% by mass and more preferably 0.5% to 3% by mass with respect to the total mass of the first solution.

The pH value of the first solution is not particularly limited; however, it is preferably 1.5 to 6.0 and more preferably 2.0 to 4.0 at a temperature of 25° C. from the viewpoint that the effect of the present invention is more excellent.

A pH meter using a pH electrode can be used for the measurement by a method of measuring pH.

In a case where the first solution contains a quaternary ammonium salt, the content of the quaternary ammonium salt in the first solution is not particularly limited; however, from the viewpoint that the effect of the present invention is more excellent, it is preferably $10^{-6}$% to $10^{-1}$% by mass and more preferably $10^{-5}$% to $10^{-3}$% by mass with respect to the total mass of the first solution.

Procedure of Step 2

A method of bringing the thin wire into contact with the first solution is not particularly limited, and examples thereof include a method of immersing a substrate having the thin wire in the first solution and a method of applying the first solution onto the thin wire.

The time of contact between the thin wire and the first solution is not particularly limited, and it is preferably 5 to 180 seconds and more preferably 20 to 120 seconds from the viewpoints of the more excellent effect of the present invention and productivity.

The temperature of the first solution at the time of contact between the thin wire and the first solution is not particularly limited; however, it is preferably 30° C. to 100° C. and more preferably 65° C. to 95° C. from the viewpoint that the effect of the present invention is more excellent.

After bringing the thin wire into contact with the first solution, the thin wire may be washed with a solvent (for example, water), as necessary.

Step 3

The step 3 is a step of subjecting the thin wire to a plating treatment to form a conductive thin wire. In a case where this step is carried out, a conductive thin wire in which a thin wire is filled with a metal (a plated metal) is formed. In particular, since there is a space formed by removing gelatin in the thin wire obtained by carrying out the above-described steps A to D, this space is filled with a metal (a plated metal).

In a case where the step 2 is carried out immediately before the step 3, the thin wire obtained in the step 2 is subjected to a plating treatment. As will be described later, in a case where the step 5 is carried out between the step 2 and the step 3, the thin wire obtained in the step 5 is subjected to a plating treatment.

The kind of plating treatment is not particularly limited. However, examples thereof include electroless plating (chemical reduction plating or displacement plating), and electrolytic plating, and electroless plating is preferable. As the electroless plating, a known electroless plating technique is used.

Examples of the plating treatment include a silver plating treatment, a copper plating treatment, a nickel plating treatment, and a cobalt plating treatment, where a silver plating treatment or a copper plating treatment is preferable and a silver plating treatment is more preferable from the viewpoint that the electric resistance of the conductive thin wire is smaller.

The components contained in the plating liquid that is used in the plating treatment are not particularly limited; however, in general, the plating liquid mainly contains, in addition to a solvent (for example, water), 1: metal ions for plating, 2: a reducing agent, 3: an additive (a stabilizing agent) that improves the stability of metal ions, and 4: a pH adjusting agent. In addition to these, the plating liquid may contain a known additive such as a stabilizing agent for the plating liquid.

The kind of metal ions for plating, contained in the plating liquid, can be appropriately selected depending on the kind of metals to be precipitated, and examples thereof include a silver ion, a copper ion, a nickel ion, and a cobalt ion.

The pH of the plating liquid is not particularly limited; however, it is preferably an alkaline pH, more preferably 8.5 to 11.0, and still more preferably 9.0 to 10.5 at a temperature of 25° C., from the viewpoint that the effect of the present invention is more excellent.

The procedure of the above-described plating treatment is not particularly limited as long as it is a method of bringing the thin wire into contact with the plating liquid, and examples thereof include a method of immersing the silver-containing layer in the plating liquid and a method of applying the plating liquid onto the thin wire.

The time of contact between the thin wire and the plating liquid is not particularly limited, and it is preferably 25 seconds to 30 minutes from the viewpoints of the more excellent effect of the present invention and productivity.

After coming into contact with the plating liquid, the thin wire may be washed with water or neutralized and washed with an acidic solution having a pH of 3 to 7, where the pH of the acidic solution is more preferably 4 to 6. In a case where the acidic solution has a pH of 3 to 7, sulfur or the like is not generated from the sulfurous acid derived from the plating liquid. In addition, the increase in pH of the plating liquid is suppressed, and the plating reaction can be stopped. The acidic solution functions as a plating stop solution.

The acidic solution preferably has a buffering action, and the solid content concentration thereof is preferably 0.1% by mass or more since the acidic solution exhibits a sufficient buffering capacity.

The temperature of the plating liquid is preferably 10° C. to 40° C. and more preferably 15° C. to 30° C.

The time of contact is not particularly limited, and it is preferably 5 to 60 seconds from the viewpoints of the more excellent effect of the present invention and productivity.

The above step 2 and step 3 may be repeatedly carried out. That is, after the step 3 is completed, the step 2 and the step 3 may be further carried out.

The number of times of repeating the procedure of the step 2 and the step 3 is not particularly limited, and it is preferably 2 to 4 times.

Step 4

The manufacturing method for a conductive substrate may further include a step 4 of subjecting the thin wire to a plating treatment between the step 1 and the step 2. In a case where the step 4 is carried out, the conductivity of the conductive thin wire is more excellent.

Since the procedure of the step 4 is the same as the procedure of the step 3 described above, the description thereof will be omitted.

It is noted that the step 4, the step 2, and the step 3 may be carried out repeatedly. That is, after the step 3 is completed, the step 4, the step 2, and the step 3 may be further carried out.

The number of times of repeating the procedure from the step 4 to the step 3 is not particularly limited, and it is preferably 2 to 4 times.

Also in the step 4, as in the step 3, after coming into contact with the plating liquid, the thin wire may be washed with water or neutralized and washed with an acidic solution having a pH of 3 to 7, where the pH of the acidic solution is more preferably 4 to 6. In a case where the acidic solution has a pH of 3 to 7, sulfur or the like is not generated from the sulfurous acid derived from the plating liquid. In addition, the increase in pH of the plating liquid is suppressed, and the plating reaction can be stopped.

The acidic solution preferably has a buffering action, and the solid content concentration thereof is preferably 0.1% by mass or more since the acidic solution exhibits a sufficient buffering capacity.

As described above, it is preferable that the step 3 or the step 4 has a neutralization and washing step of bringing the thin wire into contact with an acidic solution having a pH of 3 to 7 to stop a plating reaction by the plating treatment. Further, the acidic solution preferably has a buffering action as described above. In a case where a buffer solution is used in the neutralization and washing, it is possible to suppress the increase in pH even in a case where the plating liquid is mixed, and it is possible to uniformly stop the plating reaction.

Step 5

The manufacturing method for a conductive substrate may further include a step 5 of bringing the thin wire into contact with a solution containing a quaternary ammonium salt is further provided between the step 1 and the step 2 or between the step 2 and the step 3. In a case where this step is carried out, the quaternary ammonium salt ion adheres to the surface of the thin wire and suppresses the plating precipitation on the surface of the thin wire during the plating treatment of the step 3 described later, whereby it becomes easier for the plating liquid to permeate into the inside of the thin wire. As a result, the metal (the plated metal) is easily precipitated in the inside of the thin wire, and thus a desired effect can be obtained.

Hereinafter, first, a solution that is used in this step 5 will be described in detail, and then the procedure of the step 5 will be described in detail.

Solution Containing Quaternary Ammonium Salt

The kind of quaternary ammonium salt contained in the solution containing the quaternary ammonium salt (hereinafter, also simply referred to as a "second solution") is not particularly limited, and it is a compound having quaternary nitrogen.

The weight-average molecular weight of the quaternary ammonium salt is not particularly limited; however, it is preferably 100 to 700 and more preferably 200 to 650 from the viewpoint that the effect of the present invention is more excellent.

The quaternary ammonium salt is preferably a compound represented by General Formula (I) or a compound represented by General Formula (II).

General Formula (I)

(II)

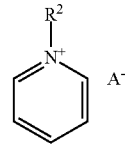

In General Formula (I), $R^1$'s each independently represent an alkyl group which may have a substituent. The four $R^1$'s may be the same group or groups different from each other.

The number of carbon atoms of the alkyl group is not particularly limited, but is preferably 1 to 30, and more preferably 1 to 20.

The kind of the substituent which may be contained in the alkyl group is not particularly limited, and examples thereof include a halogen atom, a hydroxyl group, a carboxyl group, an amino group, a cyano group, an aryl group (for example, a phenyl group), an alkoxy group, an aryloxy group, an acyl group (for example, an acetyl group), an alkoxycarbonyl group, an aryloxycarbonyl group, an acyloxy group, a monoalkylamino group, a dialkylamino group, a monoarylamino group, and a diarylamino group.

In General Formula (II), $R^2$ represents an alkyl group which may have a substituent.

Examples of the example and the suitable range of the alkyl group, which may have a substituent and is represented by $R^2$, include the example and the suitable range of the above-described alkyl group, which may have a substituent and is represented by $R^1$.

In General Formulae (I) and (II), $A^-$ represents an anion. The kind of anion is not particularly limited, and examples thereof include halogen ions (for example, $F^-$, $Cl^-$, $Br^-$, and $I^-$), $HSO_4^-$, $OH^-$, $CH_3COO^-$, $R^3CO_3^-$, $ClO_4^-$, $BF_4^-$, $SbF_6^-$, and $AsF_6^-$. Here, $R^3$ represents a hydrogen atom or an alkyl group which may have a substituent.

Examples of the example and the suitable range of the alkyl group, which may have a substituent and is represented by $R^3$, include the example and the suitable range of the above-described alkyl group, which may have a substituent and is represented by $R^1$.

The quaternary ammonium salt is preferably a compound represented by General Formula (X), a compound represented by General Formula (Y), or a compound represented by General Formula (Z) from the viewpoint that the effect of the present invention is more excellent.

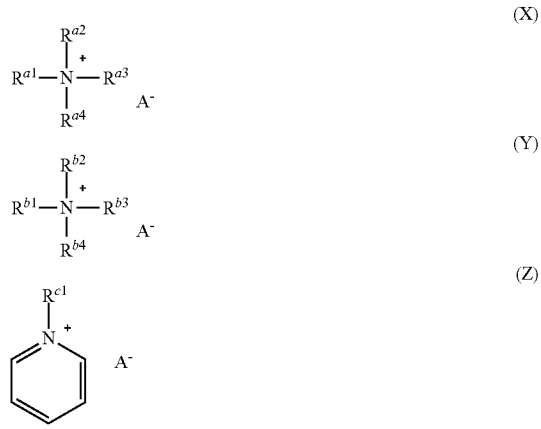

In General Formula (X), $R^{a1}$ and $R^{a2}$ each independently represent an alkyl group having 4 or less carbon atoms, which may have a substituent, and $R^{a3}$ and $R^{a4}$ each independently represent an alkyl group having 8 or more carbon atoms, which may have a substituent.

The alkyl group which may have a substituent, represented by $R^{a1}$ and $R^{a2}$, has 4 or less carbon atoms and preferably 1 or 2 carbon atoms from the viewpoint that the effect of the present invention is more excellent.

The alkyl group which may have a substituent, represented by $R^{a3}$ and $R^{a4}$, has 8 or more carbon atoms, preferably 8 to 30 carbon atoms, and more preferably 10 to 20 carbon atoms, from the viewpoint that the effect of the present invention is more excellent.

The kind of the substituent which may be contained in each of the alkyl group represented by $R^{a1}$ and $R^{a2}$ and the alkyl group represented by $R^{a3}$ and $R^{a4}$ is not particularly limited, and examples thereof include a halogen atom, a hydroxyl group, a carboxyl group, an amino group, a cyano group, an aryl group, an alkoxy group, an aryloxy group, an acyl group, an alkoxycarbonyl group, an aryloxycarbonyl group, an acyloxy group, a monoalkylamino group, a dialkylamino group, a monoarylamino group, and a diarylamino group.

In General Formula (Y), $R^{b1}$ to $R^{b3}$ each independently represent an alkyl group having 4 or less carbon atoms, which may have a substituent, and $R^{b4}$ represents an alkyl group having 10 or more carbon atoms, which may have a substituent.

The alkyl group which may have a substituent, represented by $R^{b1}$ to $R^{b3}$, has 4 or less carbon atoms and preferably 1 or 2 carbon atoms from the viewpoint that the effect of the present invention is more excellent.

The alkyl group which may have a substituent, represented by $R^{b4}$, has 8 or more carbon atoms, preferably 8 to 30 carbon atoms, and more preferably 10 to 20 carbon atoms, from the viewpoint that the effect of the present invention is more excellent.

The kind of the substituent which may be contained in each of the alkyl group represented by $R^{b1}$ to $R^{b3}$ and the alkyl group represented by $R^{b4}$ is not particularly limited, and examples thereof include the group exemplified as the substituent which may be contained in the above-described alkyl group represented by $R^{a1}$.

In General Formula (Z), $R^{c1}$ represents an alkyl group having 10 or more carbon atoms, which may have a substituent.

The alkyl group which may have a substituent, represented by $R^{c1}$, has 10 or less carbon atoms, preferably 10 to 30 carbon atoms, and more preferably 10 to 20 carbon atoms, from the viewpoint that the effect of the present invention is more excellent.

The kind of the substituent which may be contained in the alkyl group represented by $R^{c1}$ is not particularly limited, and examples thereof include the group exemplified as the substituent which may be contained in the above-described alkyl group represented by $R^{a1}$.

$A^-$ in General Formulae (X) to (Z) represents an anion. Examples of the anion represented by $A^-$ in General Formulae (X) to (Z) include the anions exemplified as the anion of $A^-$ in General Formulae (I) and (II) described above.

The second solution contains a solvent. The kind of solvent is not particularly limited, and examples of the solvent include water, organic solvents (for example, alcohols, ketones, amides, sulfoxides, esters, and ethers), ionic liquids, and mixed solvents thereof. Among them, water is preferable.

The second solution may contain other components (for example, the organic acid described above) in addition to the quaternary ammonium salt and the solvent.

The content of the quaternary ammonium salt in the second solution is not particularly limited; however, from the viewpoint that the effect of the present invention is more excellent, it is preferably $10^{-6}$% to 1% by mass and more preferably $10^{-6}$% to 0.1% by mass with respect to the total mass of the second solution.

The pH value of the second solution is not particularly limited; however, it is preferably 3 to 7 and more preferably 4 to 6 at a temperature of 25° C. from the viewpoint that the effect of the present invention is more excellent.

Procedure of Step 5

A method of bringing the thin wire into contact with the second solution is not particularly limited, and examples thereof include a method of immersing a substrate having the thin wire in the second solution and a method of applying the second solution onto the thin wire.

The time of contact between the thin wire and the second solution is not particularly limited, and it is preferably 5 to 180 seconds and more preferably 20 to 120 seconds from the viewpoints of the more excellent effect of the present invention and productivity.

The temperature of the second solution at the time of contact between the thin wire and the second solution is not particularly limited; however, it is preferably 20° C. to 80° C. and more preferably 30° C. to 70° C. from the viewpoint that the effect of the present invention is more excellent.

After bringing the thin wire into contact with the second solution, the thin wire may be washed with a solvent (for example, water), as necessary.

In a case where the step 5 is carried out between the step 1 and the step 2, the step 5, the step 2, and the step 3 may be carried out repeatedly. That is, after the step 3 is completed, the step 5, the step 2, and the step 3 may be further carried out.

The number of times of repeating the procedure from the step 5 to the step 3 is not particularly limited, and it is preferably 2 to 4 times.

In a case where the step 5 is carried out between the step 2 and the step 3, the step 2, the step 5, and the step 3 may be carried out repeatedly. That is, after the step 3 is completed, the step 2, the step 5, and the step 3 may be further carried out.

The number of times of repeating the procedure from the step 2 to the step 5 is not particularly limited, and it is preferably 2 to 4 times.

Step 6

The manufacturing method for a conductive substrate may include a step 6 of subjecting the conductive thin wire obtained in the step 3 to a heating treatment after the step 3. In a case where this step is carried out, the strength of the conductive thin wire is improved.

Examples of the heating treatment that is carried out in the step 6 include the heating treatment carried out in the step C described above.

Step 7

In the manufacturing method for a conductive substrate, the conductive thin wire may be washed with a solvent after the step 3 or after the step 6. Examples of the solvent to be used include water, organic solvents (for example, alcohols, ketones, amides, sulfoxides, esters, and ethers), ionic liquids, and mixed solvents thereof.

For the solvent to be used in washing, several kinds of solvents may be used. For example, after washing with an organic solvent, washing may be further carried out with water.

As the solvent, a mixed solvent may be used, and for example, a mixed solvent obtained by mixing alcohols or ethers with water is preferable. The alcohols are preferably ethanol, and the ethers are preferably diethylene glycol monoethyl ether or diethylene glycol monomethyl ether.

Use Application

The conductive substrate obtained as described above can be applied to various use applications, and for example, it can be applied to various use applications such as a touch panel (or a touch panel sensor), a semiconductor chip, various electrical wiring plates, flexible printed circuits (FPC), a chip on film (COF), tape automated bonding (TAB), an antenna, a multilayer interconnection board, and a motherboard. Among these, the conductive substrate according to the embodiment of the present invention is preferably used in a touch panel (a capacitance-type touch panel).

In a case where the conductive substrate according to the embodiment of the present invention is used in a touch panel, the above-described conductive thin wire can effectively function as a detection electrode.

In addition, the conductive substrate may have a conductive portion having a constitution different from that of the conductive thin wire, in addition to the above-described conductive thin wire having predetermined characteristics. This conductive portion may be electrically connected to the above-described conductive thin wire to conduct electricity.

The present invention is basically constituted as described above. As described above, the manufacturing method for a conductive substrate and the conductive substrate according to the embodiment of the present invention have been described in detail; however, the present invention is not limited to the above-described embodiments, and, needless to say, various improvements or modifications may be made without departing from the gist of the present invention.

EXAMPLES

Hereinafter, the features of the present invention will be described in more detail with reference to Examples. The materials, the reagents, the amounts and ratios of substances, the operations, and the like described in the following Examples can be appropriately modified as long as they do not depart from the gist of the present invention. As a result, the scope of the present invention is not limited to the following Examples.

Example 1

Preparation of Silver Halide Emulsion

The following liquid 2 and liquid 3 were added simultaneously in amounts corresponding to 90% of an entire amount of each thereof over 20 minutes to the following liquid 1 kept at 30° C. and a pH of 4.5 while stirring the liquid 1, whereby nuclear particles having a size of 0.16 µm were formed. Subsequently, the following liquid 4 and liquid 5 were added over 8 minutes to the obtained solution, and the remaining 10% amount of each of the following liquid 2 and liquid 3 was further added over 2 minutes, whereby the nuclear particles grew to a size of 0.10 µm. Further, 0.15 g of potassium iodide was added to the obtained solution, which was subsequently aged for 5 minutes to complete particle formation.

Liquid 1:

| | |
|---|---|
| Water | 750 ml |
| Gelatin | 8.6 g |
| Potassium bromide | 3 g |
| 1,3-dimethylimidazolidine-2-thione | 20 mg |
| Sodium benzenethiosulfonate | 10 mg |
| Citric acid | 0.7 g |

Liquid 2:

| | |
|---|---|
| Water | 300 ml |
| Silver nitrate | 150 g |

Liquid 3:

| | |
|---|---|
| Water | 300 ml |
| Sodium chloride | 38 g |
| Potassium bromide | 32 g |
| Potassium hexachloroiridate (III) (0.005% KCl 20% aqueous solution) | 5 ml |
| Ammonium hexachlororhodate (0.001% NaCl 20% aqueous solution) | 7 ml |

Liquid 4:

| | |
|---|---|
| Water | 100 ml |
| Silver nitrate | 50 g |

Liquid 5:

| | |
|---|---|
| Water | 100 ml |
| Sodium chloride | 13 g |
| Potassium bromide | 11 g |
| Yellow prussiate of potash | 5 mg |

This was followed by water washing using a flocculation method according to a conventional method. Specifically, the temperature of the obtained solution described above was decreased to 35° C. and the pH thereof was decreased (the pH thereof was in a range of 3.6±0.2) using sulfuric acid until silver halide was precipitated. Next, about 3 L of the supernatant solution was removed from the obtained solution (the first water washing). Next, 3 L of distilled water was added to the solution from which the supernatant solution had been removed, and then sulfuric acid was added thereto until the silver halide was precipitated. 3 L of the supernatant was removed again from the obtained solution (the second water washing). The same operation as the second water washing was repeated once more (the third water washing), whereby the water washing and desalting steps were completed. The emulsion after water washing and desalting was adjusted to have a pH of 6.4 and a pAg of 7.5, and then 2.5 g of gelatin, 10 mg of sodium benzenethiosulfonate, 3 mg of sodium benzenethiosulfinate, 15 mg of sodium thiosulfate, and 10 mg of chloroauric acid were added thereto, and chemosensitization was carried out at 55° C. so that the optimum sensitivity was obtained. Then, 100 mg of 1,3,3a,7-tetraazaindene as a stabilizing agent and 100 mg of PROXEL (product name, manufactured by ICI Co., Ltd.) as a preservative were further added to the obtained emulsion. The finally obtained emulsion was an emulsion of cubic silver chlorobromide particles containing 0.08% by mole of silver iodide, and 70% by mole of silver chloride and 30% by mole of silver bromide in terms of the rate of silver chlorobromide, where the average particle diameter (in terms of sphere equivalent diameter) was 100 nm and the coefficient of variation was 9%.

Preparation of Composition for Forming Photosensitive Layer 1,3,3a,7-tetraazaindene ($1.2 \times 10^{-4}$ mol/mol Ag), hydroquinone ($1.2 \times 10^{-2}$ mol/mol Ag), citric acid ($3.0 \times 10^{-4}$ mol/mol Ag), 2,4-dichloro-6-hydroxy-1,3,5-triazine sodium salt (0.90 g/mol Ag), and a trace amount of a hardening agent were added to the emulsion, thereby obtaining a composition. The pH of the composition was then adjusted to 5.6 using citric acid.

A polymer latex containing a polymer represented by (P-1) shown below (hereinafter, also referred to as a "polymer 1"), a dispersant consisting of a dialkylphenyl PEO (PEO is an abbreviation for polyethylene oxide) sulfuric acid ester, and water (in the polymer latex, the ratio of the mass of the dispersant to the mass of the polymer 1 (the mass of the dispersant/the mass of the polymer 1, unit: g/g) is 0.02, and the solid content is 22% by mass) was added to the above composition so that the ratio of the mass of the polymer 1 to the total mass of the gelatin in the composition (the mass of the polymer 1/the mass of the gelatin, unit: g/g) was 0.25/1, whereby a polymer latex-containing composition was obtained. Here, in the polymer latex-containing composition, the ratio of the mass of the gelatin to the mass of the silver derived from the silver halide (the mass of the gelatin/the mass of the silver derived from the silver halide, unit: g/g) was 0.11.

Further, EPOXY RESIN DY 022 (product name, manufactured by Nagase ChemteX Corporation) was added as a crosslinking agent. The adding amount of the crosslinking agent was adjusted so that the amount of the crosslinking agent in the silver halide-containing photosensitive layer which will be described later was 0.09 g/m². Further, a surfactant 1 and a surfactant 2, which will be described later, and sodium polystyrene sulfonate (molecular weight: about 1 million) were added as a thickener.

In such a manner as described above, a composition for forming a photosensitive layer was prepared.

It is noted that the polymer 1 was synthesized with reference to JP3305459B and JP3754745B.

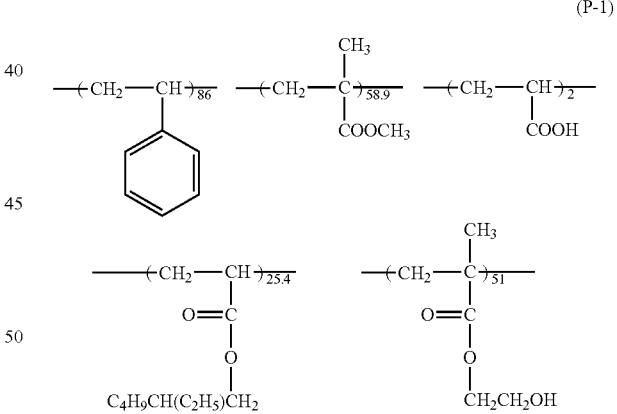

(P-1)

The above-described polymer latex was applied onto a polyethylene terephthalate film having a thickness of 40 μm ("a long roll-shaped film manufactured by FUJIFILM Corporation") to provide an undercoat layer having a thickness of 0.05 μm. This treatment was carried out in a roll-to-roll manner, and each of the following treatments (steps) was also carried out in the same manner as the roll-to-roll manner. Here, the roll width was 1 m, and the roll length was 1,000 m.

Step E-1, Step A-1, and Step F-1

Next, a composition for forming a silver halide-free layer, the above-described composition for forming a photosensitive layer, and a composition for forming a protective layer described later were simultaneously applied by multilayer coating onto the undercoat layer, and then a silver halide-free layer, a silver halide-containing photosensitive layer, and a protective layer were formed on the undercoat layer.

Here, the composition for forming a silver halide-tree layer consisted of an aqueous solution containing the above-described polymer 1, gelatin, a solid dispersion of a dye described later, a surfactant 1, a surfactant 2, a surfactant 3, and sodium polystyrene sulfonate (molecular weight: about 1 million) as a thickener, the thickness of the silver halide-free layer was 2.0 µm, the mixing mass ratio of the polymer 1 to the gelatin in the silver halide-free layer (the polymer 1/the gelatin) was 2/1, and the content of the polymer 1 was 1.3 g/m². In addition, the content of the dye was 0.08 g/m², and the contents of the surfactant 1, the surfactant 2, the surfactant 3, and the thickener were respectively 0.02 g/m², 0.02 g/m², 0.02 g/m², and 0.04 g/m².

In addition, the thickness of the silver halide-containing photosensitive layer was 2.5 µm, the mixing mass ratio of the polymer 1 to the gelatin in the silver halide-containing photosensitive layer (the polymer 1/the gelatin) was 0.25/1, and the content of the polymer 1 was 0.19 g/m². Further, the contents of the surfactant 1, the surfactant 2, and the thickener were respectively 0.04 g/m², 0.01 g/m², and 0.01 g/m².

In addition, the composition for forming a protective layer consisted of an aqueous solution containing the above-described polymer 1, gelatin, colloidal silica (average particle diameter: 12 nm, manufactured by Nissan Chemical Corporation, SNOWTEX C), the surfactant 1, the surfactant 2, the surfactant 3, the surfactant 4, sodium polystyrene sulfonate (molecular weight: about 1 million) as a thickener, and N,N'-bis(vinylsulfonylacetyl)ethylenediamineethylene bis(vinylsulfonylacetamide) as a gelatin crosslinking agent, the thickness of the protective layer was 0.15 µm, the mixing mass ratio of the polymer 1 to the gelatin in the protective layer (the polymer 1/the gelatin) was 0.1/1, and the content of the polymer 1 was 0.015 g/m². Further, the content of colloidal silica was 0.1 g/m², and the contents of the surfactant 1, the surfactant 2 (average molecular weight: 1,368), the surfactant 3, the surfactant 4, and thickener were respectively 0.01 g/m², 0.02 g/m², 0.02 g/m², 0.001 g/m², and 0.01 g/m². The content of the gelatin crosslinking agent was 3% by mass with respect to the total mass of the gelatin in all layers.

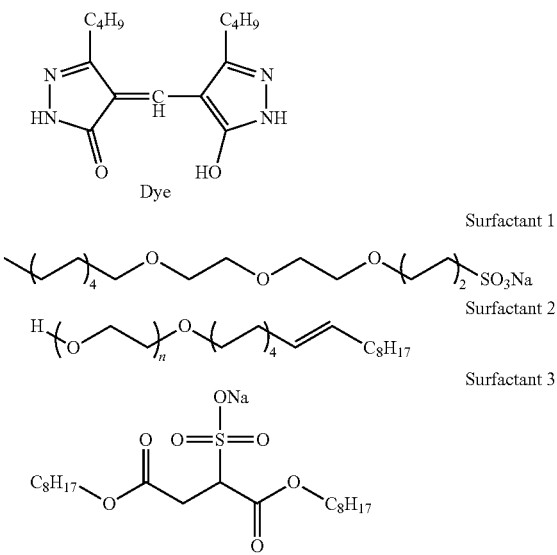

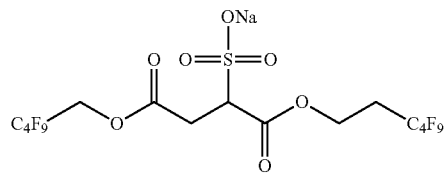

Step B

The produced photosensitive layer described above was exposed through a lattice-shaped photo mask using parallel light with a high-pressure mercury lamp as a light source. The mask for forming a pattern was used as a photo mask, where the line width of the unit square lattice that forms the lattice as illustrated in FIG. 10 was 1.2 µm, and the length L of one side of the lattice (the opening portion) was 600 µm.

After exposure to light, the obtained sample was developed with a developer which will be described later, and further subjected to a development treatment using a fixing liquid (product name: N3X-R for CN16X, manufactured by FUJIFILM Corporation). Then, the sample was rinsed with pure water at 25° C. and subsequently dried to obtain a sample A having a silver-containing layer containing metallic silver, formed in a mesh patterned manner. In the sample A, a conductive mesh pattern region having a size of 21.0 cm×29.7 cm was formed.

Composition of Developer

The following compounds are contained in 1 liter (L) of the developer.

| | |
|---|---|
| Hydroquinone | 0.037 mol/L |
| N-methylaminophenol | 0.016 mol/L |
| Sodium metaborate | 0.140 mol/L |
| Sodium hydroxide | 0.360 mol/L |
| Sodium bromide | 0.031 mol/L |
| Potassium metabisulfite | 0.187 mol/L |

The obtained sample A described above was immersed in warm water at 50° C. for 180 seconds. Then, the sample A was drained with an air shower and allowed to be air-dried.

Step C-1

The sample A obtained in the step B-1 was carried into a superheated steam treatment tank at 110° C. and allowed to stand for 30 seconds for the superheated steam treatment. The steam flow rate at this time was 100 kg/h.

Step D-1

The sample A obtained in the step C-1 was immersed in an aqueous proteolytic enzyme solution (40° C.) for 30 seconds. The sample A was taken out from the aqueous proteolytic enzyme solution, and the sample A was immersed and washed in warm water (liquid temperature: 50° C.) for 120 seconds. Then, the sample A was drained with an air shower and allowed to be air-dried.

The aqueous proteolytic enzyme solution used was prepared according to the following procedure.

Triethanolamine and sulfuric acid were added to an aqueous solution of a proteolytic enzyme (BIOPRASE 30L, manufactured by Nagase ChemteX Corporation) (proteolytic enzyme concentration: 0.5% by mass), and the pH was adjusted to 8.5.

Step 2-1

The sample A obtained in step D-1 was immersed in a 1% by mass glutaric acid aqueous solution (70° C.) for 2 minutes. The sample A was taken out from the aqueous glutaric acid solution, and the sample A was immersed and washed in water at 30° C. for 5 seconds. Glutaric acid manufactured by FUJIFILM Wako Pure Chemical Corporation was used.

Step 3-1

The sample A obtained in the step 2-1 was immersed in a plating liquid A (30° C.) having the following composition for 5 minutes. The sample A was taken out from the plating liquid A, and the sample A was immersed and washed in a 1% by mass citric acid buffer solution (pH=5, liquid temperature: 25° C.) for 30 seconds. That is, the neutralization and washing were carried out.

The composition of the plating liquid A (total volume: 1,200 ml) was as follows. The pH of the plating liquid A was 9.9, where the pH was adjusted by adding a predetermined amount of potassium carbonate (manufactured by FUJIFILM Wako Pure Chemical Corporation). In addition, the following components used were all manufactured by FUJIFILM Wako Pure Chemical Corporation. No change in line width was observed before and after the plating treatment.

| Composition of plating liquid A | |
|---|---|
| $AgNO_3$ | 2.1 g |
| Sodium sulfite | 86 g |
| Sodium thiosulfate pentahydrate | 60 g |
| Aron T-50 (manufactured by Toagosei Co., Ltd., solid content concentration: 40% | 36 g |
| Methyl hydroquinone | 13 g |
| Potassium carbonate | predetermined amount |
| Water | remainder |

Step 7-1

The sample A obtained in the step 3-1 was immersed in a solution of a mass ratio of water/diethylene glycol monoethyl ether=30/70 (liquid temperature: 50° C.) for 60 seconds. Then, the obtained sample A was immersed and washed in water (liquid temperature: 30° C.) for 30 seconds.

Step 6-1

The sample A obtained in the step 3-1 was carried into a superheated steam treatment tank at 110° C. and allowed to stand for 30 seconds for the superheated steam treatment. The steam flow rate at this time was 100 kg/h. The obtained conductive mesh pattern region was a mesh-shaped layer formed from the conductive thin wire. The line width of the conductive thin wire was 1.8 μm, and the thickness (the height) of the conductive thin wire was 1.8 μm.

The obtained sample A was coated with Pt using an ion sputtering device (an E-1030 type ion sputter, manufactured by Hitachi High-Tech Corporation) in order to impart conductivity to the surface of the conductive thin wire. In this state, the vertical cross section of the conductive thin wire was processed with an ion beam processing function of a scanning electron microscope having a focused ion beam processing function (Helios 600i manufactured by Thermo Fisher Scientific, Inc.), and the exposed cross-sectional morphology was observed, whereby the region where the metal inside the conductive thin wire was present could be observed, and an observation image of the vertical cross section was obtained. The observation was carried out under conditions of a backscattered electron mode and an acceleration voltage of 1 kV.

The "line width" and "Gray value" shown in Table 1 were measured after the heated steam treatment in the step 6-1 and a microscope VHX-5000 manufactured by KEYENCE Corporation was used for the measurement.

Examples 2 to 12 and 18 to 22

Conductive substrates were prepared according to the same procedure as in Example 1 except that the kind of the first solution used, the temperature of the first solution used, the kind of substrate used, the line width of the conductive thin wire used, and the aspect ratio of the conductive thin wire used were changed as shown in Table 1 described later.

The line width of the conductive thin wire was controlled by adjusting the exposure amount in the step B-1. Further, the aspect ratio of the conductive thin wire was controlled by adjusting the coating amount of the composition for forming a photosensitive layer.

Example 13

A conductive substrate was produced according to the same procedure as in Example 1 except that the following step 5-13 was carried out between the step D-1 and the step 2-1.

Step 5-13

The sample A obtained in the step D-1 was immersed in a 0.1% by mass aqueous laurylpyridinium chloride solution (30° C.) for 2 minutes. The sample A was taken out from the aqueous laurylpyridinium chloride solution, and the sample. A was immersed and washed in water at 30° C. for 5 seconds. Laurylpyridinium chloride manufactured by FUJIFILM Wako Pure Chemical Corporation was used.

Example 14

A conductive substrate was produced according to the same procedure as in Example 1 except that the following step 5-14 was carried out between the step 2-1 and the step 3-1.

Step 5-14

The sample A obtained in the step 2-1 was immersed in a 0.1% by mass aqueous laurylpyridinium chloride solution (30° C.) for 2 minutes. The sample A was taken out from the aqueous laurylpyridinium chloride solution, and the sample A was immersed and washed in water at 30° C. for 5 seconds. Laurylpyridinium chloride manufactured by FUJIFILM Wako Pure Chemical Corporation was used.

Examples 15 to 17

Conductive substrates were produced according to the same procedure as in Example 14 except that the kind of the second solution used was changed as shown in Table 1 described later.

Comparative Example 1

A conductive substrate was produced according to the same procedure as in Example 1 except that the step 2-1 and the step 3-1 were not carried out.

Comparative Example 2

A conductive substrate was produced according to the same procedure as in Example 1 except that the step 2-1 was not carried out.

Evaluation

Hereinafter, conductivity, bendability, and visibility, which are evaluation items, will be described.

Conductivity

The conductivity was evaluated by measuring the line resistance value of the conductive mesh pattern region of the obtained conductive substrate. The line resistance value is a value obtained by measuring a resistance value by the four point probe method and dividing it by the distance between the measurement terminals. More specifically, after disconnecting both ends of any one conductive thin wire that constitutes a mesh pattern to cut and separate it from the mesh pattern, four (A, B, C, D) microprobes (tungsten probes (diameter: 0.5 µm), manufactured by Micro Support Co., Ltd.) were brought into contact with the cut and separated conductive thin wire, a constant current I was applied to the outermost probes A and D using a source meter (a 2400 type general-purpose source meter, a source meter manufactured by KEITHLEY Instruments) so that a voltage V between the internal probes B and C, which were separated apart by 250 µm, became 5 mV, a resistance value Ri=V/I was measured, and the obtained resistance value Ri was divided by the distance between B and C to determine the line resistance value. The obtained resistance value Ri was divided by the distance between B and C to obtain a line resistance value, and the average value of the measured values at any 10 places was evaluated as the conductivity according to the following criteria. In the evaluation of conductivity, among the following 1 to 5, 3 or more is preferable, 4 or more is more preferable, and 5 is still more preferable.

5: The line resistance value is less than 60 Ω/mm.
4: The line resistance value is 60 Ω/mm or more and less than 80 Ω/mm.
3: The line resistance value is 80 Ω/mm or more and less than 100 Ω/mm.
2: The line resistance value is 100 Ω/mm or more and less than 200 Ω/mm.
1: The line resistance value is 200 Ω/mm or more.

Bendability

Regarding the bendability, the obtained conductive substrate was bent a plurality of times with a bending tester in a direction in which the angle between the direction in which the conductive thin wire extends and the bending direction is 45°, and the change in conductivity was measured and evaluated. For the bending test, a small desktop tester TCDM111LH manufactured by YUASA SYSTEM Co., Ltd. was used. The bending radius was set to 2 mm, and the resistance change δ after bending 200,000 times was evaluated according to the following criteria. The resistance change δ is expressed by, resistance change δ=(resistance value after bending test)/(resistance value before bending test).

The "resistance value" here refers to a resistance value Ri obtained by the above-described conductivity evaluation. In the evaluation of bendability, among the following 1 to 5, 3 or more is preferable, 4 or more is more preferable, and 5 is still more preferable.

5: δ is less than 1.1.
4: δ is 1.1 or more and less than 1.15.
3: δ is 1.15 or more and less than 1.2.
2: δ is 1.2 or more and less than 1.5.
1: δ is 1.5 or more, or the conductive thin wire is broken.

Visibility

The obtained conductive substrate was laminated in the order of glass/conductive substrate/polarizing plate/polarizing plate (which is arranged in a direction in which the plane of polarization is orthogonal)/black PET (manufactured by PANAC Co., Ltd., industrial black PET (GPH100E82A04)), whereby a laminate was obtained. In the conductive substrate, the conductive substrate was arranged so that the conductive mesh pattern was located on the glass side.

Next, ten observers visually observed the obtained laminate under the ambient light of 500 lux from the front on the glass surface side and obliquely by an angle of 30° to 60° and evaluated visibility according to the following criteria. It is noted that in a case where the mesh pattern is difficult to be visible, the optical characteristics are excellent, and moire generated in a case where the conductive substrate is laminated on a display is reduced. In the evaluation of visibility, among the following 1 to 5, 3 or more is preferable, 4 or more is more preferable, and 5 is still more preferable.

5: In a case where the conductive substrate is observed from a position 15 cm away, the mesh pattern is not visible.
4: In a case where the conductive substrate is observed from a position 30 cm away, there is no or one observer who visually recognizes the mesh pattern.
3: In a case where the conductive substrate is observed from a position 30 cm away, there are two to four observers who visually recognize the mesh pattern.
2: In a case where the conductive substrate is observed from a position 30 cm away, there are five or more observers who visually recognize the mesh pattern.
1: In a case where the conductive substrate is observed from a position 50 cm away, there are five or more observers who visually recognize the mesh pattern.

Regarding the used compounds in Table 1, "LPC" indicates laurylpyridinium chloride (manufactured by FUJIFILM Wako Pure Chemical Corporation), "DSAB" indicates disstearyldimethylammonium bromide (manufactured by FUJIFILM Wako Pure Chemical Corporation), and "EPB" indicates ethylpyridinium bromide (manufactured by Tokyo Chemical Industry Co., Ltd.).

In Table 1, the column of "Compound" in the column of "first solution" indicates the kind of organic acid contained in the first solution, the column of "Concentration" in the column of "first solution" indicates the content (% by mass) of the organic acid contained in the first solution with respect to the total mass of the first solution, the column of "pH" in the column of "first solution" indicates the pH of the first solution, and the column of "Temperature" in the column of "first solution" indicates the temperature of the first solution.

In Examples 11 and 12, it is indicated that the first solution contains two kinds of compounds of glutaric acid and LPC, and in the column of "Concentration", the numerical value on the left side indicates the content (% by mass) of glutaric acid with respect to the total mass of the first solution, and the numerical value on the right side indicates the content (% by mass) of LPC with respect to the total mass of the first solution.

In Table 1, the column of "Compound" in the column of "Second solution" indicates the kind of organic acid contained in the second solution, the column of "Concentration" in the column of "Second solution" indicates the content (% by mass) of the organic acid contained in the second solution with respect to the total mass of the second solution, the column of "pH" in the column of "Second solution" indicates the pH of the second solution, and the column of "Temperature" in the column of "Second solution" indicates the temperature of the second solution.

In Table 1, the column of "Internal silver density" indicates a proportion of a region showing silver (metal) within the maximum inscribed circle of the observation region where the silver (the metal) is observed, in the vertical cross section of the conductive thin wire in a direction orthogonal to a direction in which the conductive thin wire extends.

In Table 1, the column of "Line width" represents the line width of the conductive thin wire.

In Table 1, the column of "Thickness (Height)" represents the thickness (the height) of the conductive thin wire.

In Table 1, the column of "Aspect ratio" represents the aspect ratio of the conductive thin wire (the ratio of the height of the conductive thin wire to the line width of the conductive thin wire).

In Table 1, the column of "Gray value" represents the above-described Gray value obtained by imaging the conductive thin wire using reflected light.

In Table 1, the column of "Ratio γ" represents the above-described ratio γ represented by Lm/Ls.

As described above, in Example 13, the step 5 using the second solution was carried out before the step 2 using the first solution, and in Examples 14 to 17, the step 5 using the second solution was carried out after the step 2 using the first solution.

TABLE 1

|  | Substrate | Compound | Concentration | pH | Temperature | Compound | Concentration | Temperature | Internal silver density (%) |
|---|---|---|---|---|---|---|---|---|---|
| Example 1 | PET | Glutaric acid | 1% | 2.7 | 70° C. |  |  |  | 92 |
| Example 2 | PET | Glutaric acid | 1% | 2.7 | 80° C. |  |  |  | 93 |
| Example 3 | PET | Glutaric acid | 2% | 2.6 | 70° C. |  |  |  | 91 |
| Example 4 | PET | Glutaric acid | 5% | 2.4 | 70° C. |  |  |  | 92 |
| Example 5 | PET | Glutaric acid | 0.20% | 2.8 | 70° C. |  |  |  | 90 |
| Exaniplc 6 | PET | Glutaric acid | 1% | 2.7 | 30° C. |  |  |  | 86 |
| Example 7 | PET | Glutaric acid | 1% | 2.7 | 95° C. |  |  |  | 93 |
| Example 8 | PET | Citric acid | 1% | 2.2 | 70° C. |  |  |  | 92 |
| Example 9 | PET | Tartaric acid | 1% | 2 | 70° C. |  |  |  | 90 |
| Example 10 | PET | Lactic acid | 1% | 2.2 | 70° C. |  |  |  | 85 |
| Example 11 | PET | Glutaric and/LPC | 1%/10% | 3 | 70° C. |  |  |  | 90 |
| Example 12 | PET | Glutaric and/LPC | 1% | 3 | 70° C. |  |  |  | 90 |
| Example 13 | PET | Glutaric acid | 1% | 2.7 | 70° C. | LPC | 0.1% | 30° C. | 85 |
| Example 14 | PET | Glutaric acid | 1% | 2.7 | 70° C. | LPC | 0.1% | 30° C. | 92 |
| Example 15 | PET | Glutaric acid | 1% | 2.7 | 70° C. | LPC | $10^{-3}$% | 30° C. | 92 |
| Example 16 | PET | Glutaric acid | 1% | 2.7 | 70° C. | DSAB | $10^{-3}$% | 30° C. | 92 |
| Example 17 | PET | Glutaric acid | 1% | 2.7 | 70° C. | EPB | $10^{-3}$% | 30° C. | 85 |
| Example 18 | PET | Glutaric acid | 1% | 2.7 | 70° C. | — | — | — | 92 |
| Example 19 | PET | Glutaric acid | 1% | 2.7 | 70° C. | — | — | — | 92 |
| Example 20 | PET | Glutaric acid | 1% | 2.7 | 70° C. | — | — | — | 90 |
| Example 21 | PET | Glutaric acid | 1% | 2.7 | 70° C. | — | — | — | 90 |
| Example 22 |  | Glutaric acid | 1% | 2.7 | 70° C. | — | — | — | 92 |
| Comparative Examale 1 | PET |  |  |  | Without plating |  |  |  | 50 |
| Comparative Example 2 | PET | — | — | — | — | — | — | — | 70 |

|  | Line width (μm) | Thickness (height) (μm) | Aspect ratio | Gray value | Ratio γ | Conductivity | Bendability | Visibility |
|---|---|---|---|---|---|---|---|---|
| Example 1 | 1.8 | 1.8 | 1.0 | 110 | 1.4 | 5 | 5 | 5 |
| Example 2 | 1.8 | 1.8 | 1.0 | 119 | 1.4 | 5 | 5 | 5 |
| Example 3 | 1.8 | 1.8 | 1.0 | 110 | 1.4 | 4 | 5 | 5 |
| Example 4 | 1.8 | 1.8 | 1.0 | 110 | 1.4 | 4 | 5 | 5 |
| Example 5 | 1.8 | 1.8 | 1.0 | 120 | 1.3 | 4 | 5 | 4 |
| Exaniplc 6 | 1.8 | 1.8 | 1.0 | 120 | 1.3 | 4 | 5 | 4 |
| Example 7 | 1.8 | 1.8 | 1.0 | 100 | 1.5 | 5 | 5 | 5 |
| Example 8 | 1.8 | 1.8 | 1.0 | 110 | 1.4 | 5 | 5 | 5 |
| Example 9 | 1.8 | 1.8 | 1.0 | 110 | 1.4 | 4 | 5 | 5 |
| Example 10 | 1.8 | 1.8 | 1.0 | 110 | 1.4 | 3 | 5 | 5 |
| Example 11 | 1.8 | 1.8 | 1.0 | 110 | 1.4 | 4 | 5 | 5 |
| Example 12 | 1.8 | 1.8 | 1.0 | 110 | 1.4 | 4 | 5 | 5 |
| Example 13 | 1.8 | 1.8 | 1.0 | 120 | 1.3 | 3 | 5 | 4 |
| Example 14 | 1.8 | 1.8 | 1.0 | 110 | 1.4 | 3 | 5 | 5 |
| Example 15 | 1.8 | 1.8 | 1.0 | 100 | 1.5 | 4 | 5 | 5 |
| Example 16 | 1.8 | 1.8 | 1.0 | 100 | 1.5 | 4 | 5 | 5 |
| Example 17 | 1.8 | 1.8 | 1.0 | 100 | 1.5 | 3 | 5 | 5 |
| Example 18 | 2 | 1.8 | 0.9 | 110 | 1.4 | 5 | 5 | 5 |
| Example 19 | 2.5 | 1.8 | 0.7 | 120 | 1.3 | 5 | 5 | 4 |
| Example 20 | 5 | 1.8 | 0.4 | 110 | 1.4 | 5 | 3 | 3 |
| Example 21 | 1.8 | 1.8 | 1.6 | 110 | 1.4 | 5 | 3 | 5 |
| Example 22 | 1.8 | 1.8 | 1.0 | 110 | 1.4 | 5 | 1 | 5 |
| Comparative Examale 1 | 1.8 | 1.8 | 0.6 | 90 | 1.6 | 1 | 5 | 5 |
| Comparative Example 2 | 1.8 | 1 8 | 1.0 | 160 | 1.1 | 2 | 5 | 1 |

As shown in Table 1 above, the conductive substrate according to the embodiment of the present invention exhibits a predetermined effect.

From the comparison among Examples 1 to 17, it was confirmed that the conductivity is more excellent in a case where the internal silver density is 86% or more.

In addition, from the comparison between Examples 1 to 17, it was confirmed that the visibility is more excellent in a case where the Gray value is 115 or less.

In addition, from the comparison between Example 20 and other Examples, it was confirmed that the visibility is more excellent in a case where the line width of the conductive thin wire is 0.1 μm or more and less than 5.0 μm.

In addition, from the comparison between Examples 20 and 21 and other Examples, it was confirmed that the bendability is more excellent in a case where the aspect ratio of the conductive thin wire is 0.6 or more and less than 1.5.

In addition, from the comparison between Example 22 and other Examples, it was confirmed that the bendability is more excellent in a case where a flexible film is used as the substrate.

In addition, from the comparison between Examples 1, 2, 6, to 7, it was confirmed that a more excellent effect can be obtained in a case where the temperature of the first solution is 65° C. to 95° C.

In addition, from the comparison between Examples 1 and 3 to 5, it was confirmed that an excellent effect is obtained in a case where the content of the organic acid in the first solution is 0.5% by mass or more (preferably 0.5% to 1.5% by mass).

Further, from the comparison between Examples 1 and 8 to 10, it was confirmed that a more excellent effect can be obtained in a case where a carboxylic acid having a valence of 2 or more is used as the organic acid.

Examples 23 to 28 and Comparative Examples 3 and 4

Conductive substrates were manufactured according to the same procedure as in Example 1 except that the temperature of the aqueous proteolytic enzyme solution, the immersion time, and the kind and immersion time of a solution X were changed as shown in Table 2 described later.

It is noted that in Comparative Examples 3 and 4, the treatment with the solution X was not carried out.

Further, in Examples 23 to 28, exposure was carried out using a mask with which such a touch panel sensor (a detection electrode layer, a peripheral wire, and a shield electrode) as illustrated in FIG. 17 can be obtained.

The BCA method was used to quantify the amount of gelatin in the thin wire obtained after carrying out the treatment (the step D) using the aqueous proteolytic enzyme solution and the amount of gelatin in the conductive thin wire obtained after carrying out the plating treatment (the step 3). The results are summarized in Table 2.

The ratio of the number of atoms (carbon atoms/silver atoms) between the carbon atom and the silver atom in the inside region on a side toward the substrate from the position where the rate of the number of metal atoms inside the conductive thin wire in the conductive substrate is 50% or more was calculated by carrying out analysis with an Ar sputter (2 kV, Ar ion, 2 mm×2 mm) and XPS (X-ray source: Al Kα, Quantera SXM manufactured by ULVAC-PHI, Inc.), in the depth direction from the surface of the peripheral pattern on a side opposite to the substrate side.

The column of "Remaining amount 1" in Table 2 indicates the amount of gelatin in the thin wire obtained after carrying out the step D.

The column of "Remaining amount 2" in Table 2 indicates the amount of gelatin in the shield electrode after the step 3.

The column of "Remaining amount 3" in Table 2 indicates the amount of gelatin in the detection electrode after the step 3.

The column of "Remaining amount 4" in Table 2 indicates the amount of gelatin in the peripheral wire after the step 3.

The column of "Peripheral pattern" in Table 2 indicates the C/Ag ratio at the shield electrode.

TABLE 2

| | | Step D | | | | | | | Internal silver density % | Line width (μm) |
| | | Temperature of aqueous proteolytic enzyme solution (° C.) | Immersion time | Solution X | | | | | | |
| | Substrate | | | Compound | Concentration | pH | Temperature | Immersion time | | |
|---|---|---|---|---|---|---|---|---|---|---|
| Example 23 | PET | 40° C. | 30 second | Glutaric acid | 1% | 2.7 | 74° C. | 120 second | 93 | 1.8 |
| Example 24 | PET | 40° C. | 30 second | Glutaric acid | 1% | 2.7 | 74° C. | 90 second | 93 | 1.8 |
| Example 25 | PET | 40° C. | 30 second | Glutaric acid | 1% | 2.7 | 74° C. | 30 second | 93 | 1.8 |
| Example 26 | PET | 40° C. | 30 second | Glutaric acid | 1% | 2.7 | 74° C. | 30 second | 92 | 1.8 |
| Example 27 | PET | 40° C. | 30 second | Glutaric acid | 1% | 2.7 | 74° C. | 30 second | 91 | 1.8 |
| Example 28 | PET | 40° C. | 30 second | Glutaric acid | 1% | 2.7 | 74° C. | 30 second | 91 | 1.8 |
| Comparative Example 3 | PET | 40° C. | 30 second | — | — | — | — | — | 70 | 1.8 |
| Comparative Example 4 | PET | 40° C. | 30 second | — | — | — | — | — | 69 | 1.8 |

TABLE 2-continued

| | Thickness (height) (μm) | Aspect ratio | Gray value | Remaining amount mg/m³ | Remaining amount mg/m³ | Remaining amount mg/m³ | Remaining amount mg/m³ | Peripheral pattern C/Ag ratio | Conductivity | Visibility |
|---|---|---|---|---|---|---|---|---|---|---|
| Example 23 | 1.8 | 1.0 | 110 | 692 | 580 | 80 | 142 | 0.35 | 5 | 5 |
| Example 24 | 1.8 | 1.0 | 109 | 692 | 584 | 82 | 143 | 0.35 | 5 | 5 |
| Example 25 | 1.8 | 1.0 | 109 | 692 | 587 | 84 | 144 | 0.35 | 5 | 5 |
| Example 26 | 1.8 | 1.0 | 108 | 510 | 460 | 62 | 110 | 0.27 | 5 | 5 |
| Example 27 | 1.8 | 1.0 | 107 | 230 | 215 | 29 | 51 | 0.13 | 5 | 4 |
| Example 28 | 1.8 | 1.0 | 109 | 180 | 168 | 10 | 40 | 001 | 5 | 4 |
| Comparative Example 3 | 1.8 | 1.0 | 160 | 692 | 367 | 51 | 89 | 0.22 | 2 | 1 |
| Comparative Example 4 | 1.8 | 1.0 | 161 | 230 | 195 | 26 | 46 | 0.13 | 2 | 1 |

As shown in Table 2, it was confirmed that the predetermined effect can be obtained even in a case where the time of gelatin removal or the time of contact with the solution X is changed.

Example 29

A conductive substrate was manufactured according to the same procedure as in Example 1 except that the photomask was changed so that the detection electrode (length: 18 cm, width: 2 mm, line width of conductive thin wire: 1.8 μm, opening ratio: 99) and the peripheral wire (width: 20 μm, length: 11 cm), which are illustrated in FIG. 12, could be obtained, and the temperature of the solution X and the immersion time therein were changed.

Example 30

A conductive substrate was manufactured according to the same procedure as in Example 29 except that the exposure amount of the peripheral wire was adjusted to be 0.3 times the exposure amount of the detection electrode.

Example 31

A conductive substrate was manufactured according to the same procedure as in Example 1 except that the photomask was changed so that the detection electrode (length: 18 cm, width: 2 mm, line width of conductive thin wire: 1.8 μm, opening ratio: 99) and the peripheral wire (the first wiring part, width: 10 μm, length: 7 cm; the second wiring part, width: 20 μm, length: 4 cm), which are illustrated in FIG. 13, could be obtained, and the temperature of the solution X and the immersion time therein were changed.

Example 32

A conductive substrate was manufactured according to the same procedure as in Example 31 except that the exposure amount of the peripheral wire was adjusted to be 0.3 times the exposure amount of the detection electrode.

Example 33

A conductive substrate was manufactured according to the same procedure as in Example 31 except that the width of the first wiring part was changed to 5 mm.

Example 34

A conductive substrate was manufactured according to the same procedure as in Example 33 except that the exposure amount of the peripheral wire was adjusted to be 0.3 times the exposure amount of the detection electrode.

As shown in Table 3, it was confirmed that the predetermined effect can be obtained even in a case where the pattern is changed to a pattern in which the peripheral wire is connected or the film thickness of the peripheral wire is changed.

TABLE 3

| | Solution X | | First wiring part | | Wiring part having width of 20 μm | | Internal silver density % | Line width (μm) |
|---|---|---|---|---|---|---|---|---|
| | Temperature | Immersion time | Width (μm) | Thickness (height) (μm) | Length (cm) | Thickness (height) (μm) | Length (cm) | | |
| Example 29 | 74° C. | | — | — | — | 1.9 | 11 | 93 | 1.8 |
| Example 30 | 74° C. | | — | — | — | 1 | 11 | 93 | 1.8 |
| Example 31 | 74° C. | | 10 | 1.8 | 7 | 1.9 | 4 | 93 | 1.8 |
| Example 32 | 74° C. | | 10 | 0.9 | 7 | 1 | 4 | 93 | 1.8 |
| Example 33 | 74° C. | | 5 | 1.7 | 7 | 1.9 | 4 | 93 | 1.8 |
| Example 34 | 74° C. | | 5 | 0.8 | 7 | 1 | 4 | 93 | 1.8 |

TABLE 3-continued

|  | Thickness (height) (μm) | Aspect ratio | Gray value | Conductivity | Visibility |
|---|---|---|---|---|---|
| Example 29 | 1.8 | 1.0 | 110 | 5 | 4 |
| Example 30 | 1.8 | 1.0 | 110 | 5 | 5 |
| Example 31 | 1.8 | 1.0 | 110 | 5 | 5 |
| Example 32 | 1.8 | 1.0 | 110 | 5 | 5 |
| Example 33 | 1.8 | 1.0 | 110 | 5 | 5 |
| Example 34 | 1.8 | 1.0 | 110 | 5 | 5 |

Example 35

A conductive substrate was manufactured according to the same procedure as in Example 27 except that the photomask was changed so that the detection electrode (length: 18 cm, width: 2 mm, line width of conductive thin wire: 1.8 μm, opening ratio: 99) and the peripheral wire (width: 20 μm, length: 11 cm), which are illustrated in FIG. 12, could be obtained.

Example 36

A conductive substrate was manufactured according to the same procedure as in Example 35 except that a halftone mask obtained by applying a semi-transmissive film only to the peripheral wiring part of the photo mask used in Example 35 was used so that the exposure amount of the peripheral wire was to be 0.35 times the exposure amount of the detection electrode.

Example 37

A conductive substrate was manufactured according to the same procedure as in Example 35 except that a halftone mask obtained by applying a semi-transmissive film only to the peripheral wiring part of the photo mask used in Example 35 was used so that the exposure amount of the peripheral wire was to be 0.25 times the exposure amount of the detection electrode.

Example 38

A conductive substrate was manufactured according to the same procedure as in Example 27 except that the photomask was changed so that the detection electrode (length: 18 cm, width: 2 mm, line width of conductive thin wire: 1.8 μm, opening ratio: 99) and the peripheral wire (the first wiring part, width: 10 μm, length: 7 cm; the second wiring part, width: 20 μm, length: 4 cm), which are illustrated in FIG. 13, could be obtained.

Example 39

A conductive substrate was manufactured according to the same procedure as in Example 35 except that a halftone mask obtained by applying a semi-transmissive film only to the peripheral wiring part of the photo mask used in Example 38 was used so that the exposure amount of the peripheral wire was to be 0.35 times the exposure amount of the detection electrode.

Example 40

A conductive substrate was manufactured according to the same procedure as in Example 35 except that a halftone mask obtained by applying a semi-transmissive film only to the peripheral wiring part of the photo mask used in Example 38 was used so that the exposure amount of the peripheral wire was to be 0.25 times the exposure amount of the detection electrode.

Example 41

A conductive substrate was manufactured according to the same procedure as in Example 38 except that the width of the first wiring part was changed to 5 mm.

Example 42

A conductive substrate was manufactured according to the same procedure as in Example 39 except that the width of the first wiring part was changed to 5 mm.

Example 43

A conductive substrate was manufactured according to the same procedure as in Example 40 except that the width of the first wiring part was changed to 5 mm.

As shown in Table 4, it was confirmed that the predetermined effect can be obtained even in a case where the pattern is changed to a pattern in which the peripheral wire is connected or the film thickness of the peripheral wire is changed.

TABLE 4

| | First wiring part | | | | Wiring part having width of 20 μm | | | Internal silver density (%) | Detection electrode | | | |
|---|---|---|---|---|---|---|---|---|---|---|---|---|
| | Line Width (μm) | Thickness (height) (μm) | Aspect ratio | Length (cm) | Line Width (μm) | Aspect ratio | Length (cm) | | Line width (μm) | Thickness (height) (μm) | Aspect ratio | Gray value |
| Example 27 | — | — | — | — | — | — | — | 91 | 1.8 | 1.8 | 1.0 | 107 |
| Example 35 | — | — | — | — | 2.6 | 0.13 | 11 | 93 | 1.8 | 1.8 | 1.0 | 107 |

TABLE 4-continued

| | | | | | | | | | | | | | |
|---|---|---|---|---|---|---|---|---|---|---|---|---|---|
| Example 36 | — | — | — | — | 1.8 | 0.08 | 11 | 93 | 1.8 | 1.8 | 1.0 | 107 |
| Example 37 | — | — | — | — | 0.7 | 0.04 | 11 | 93 | 1.8 | 1.8 | 1.0 | 107 |
| Example 38 | 10 | 2.4 | 0.24 | 7 | 2.6 | 0.13 | 4 | 93 | 1.8 | 1.8 | 1.0 | 107 |
| Example 39 | 10 | 1.4 | 0.14 | 7 | 1.5 | 0.08 | 4 | 93 | 1.8 | 1.8 | 1.0 | 107 |
| Example 40 | 10 | 0.6 | 0.06 | 7 | 0.7 | 0.04 | 4 | 93 | 1.8 | 1.8 | 1.0 | 107 |
| Example 41 | 5 | 2.5 | 0.50 | 7 | 2.6 | 0.13 | 4 | 93 | 1.8 | 1.8 | 1.0 | 107 |
| Example 42 | 5 | 1.1 | 0.22 | 7 | 1.5 | 0.08 | 4 | 93 | 1.8 | 1.8 | 1.0 | 107 |
| Example 43 | 5 | 0.5 | 0.10 | 7 | 0.7 | 0.04 | 4 | 93 | 1.8 | 1.8 | 1.0 | 107 |

| | Detection unit | First wiring part | Wiring part having width of 20 μm | Visibility |
|---|---|---|---|---|
| Example 27 | 5 | — | — | 4 |
| Example 35 | 5 | — | 5 | 4 |
| Example 36 | 5 | — | 5 | 4 |
| Example 37 | 5 | — | 5 | 4 |
| Example 38 | 5 | 5 | 5 | 4 |
| Example 39 | 5 | 5 | 5 | 4 |
| Example 40 | 5 | 5 | 5 | 4 |
| Example 41 | 5 | 5 | 5 | 4 |
| Example 42 | 5 | 5 | 5 | 4 |
| Example 43 | 5 | 5 | 5 | 4 |

Example 44

One hundred sheets of samples A were continuously produced in the same procedure as in Example 1. Regarding the developer and the fixing liquid of the step B, the aqueous proteolytic enzyme solution of the step D-1, the 1% by mass glutaric acid aqueous solution of the step 2-1, and the 1% by mass citric acid buffer solution of the step 3-1, identical solutions were continuously used. Regarding other liquids, new liquids were used each time. The same evaluation as in Example 1 was carried out on the 100th sample.

Example 45

Samples were produced according to the same procedure as in Example 44 except that the 1% by mass citric acid buffer solution of the step 3-1 was changed to a 0.15% by mass citric acid aqueous solution (pH: 2.7).

Example 46

Samples were produced according to the same procedure as in Example 44 except that the 1% by mass citric acid buffer solution of the step 3-1 was changed to pure water.

As shown in Table 5, in Example 44, a buffer solution is used as the plating stop solution, the pH increase is suppressed even in a case where the plating liquid is mixed, and even in a case where one hundred sheets are continuously treated, it is possible to maintain the performance at the first sheet. Further, in Example 45, the pH of the buffer solution used as the plating stop solution is low sulfur and the like are generated from the sulfurous acid derived from the plating liquid, and thus the conductivity is slightly decreased. In Example 46, pure water is used as the plating stop solution, the pH increases as the plating liquid becomes mixed, and thus the plating reaction becomes difficult to stop, whereby the Gray value increases and the visibility becomes slightly deteriorated.

| | | First Solution | | | | Washing after plating | | | Internal silver density |
|---|---|---|---|---|---|---|---|---|---|
| | Substrate | Compound | Compound | pH | Temperature | Compound | pH | Temperature | (%) |
| Example 44 | PET | Glutaric acid | 1% | 2.7 | 70° C. | 1% citric, add buffer solution | 5 | 25° C. | 92 |
| Example 45 | PET | Glutaric acid | 1% | 2.7 | 70° C. | 0.15% citric acid | 2.7 | 25° C. | 92 |
| Example 46 | PEE | Glutaric acid | 1% | 2.7 | 70° C. | Pure water | 7 | 25° C. | 92 |

| | Line width (μm) | Thickness (height) (μm) | Aspect ratio | Gray value | Ratio γ | Conductivity | Bendability | Visibility |
|---|---|---|---|---|---|---|---|---|
| Example 44 | 1.8 | 1.8 | 1.0 | 110 | 1.4 | 5 | 5 | 5 |
| Example 45 | 1.8 | 1.8 | 1.0 | 110 | 1.4 | 4 | 5 | 5 |
| Example 46 | 1.9 | 1.8 | 0.9 | 130 | 1.3 | 5 | 5 | 3 |

EXPLANATION OF REFERENCES

10: conductive substrate
12: substrate
12a, 14a: surface
12b: back surface
14, 14B: conductive thin wire
15: metal
16: polymer
18: opening portion
20: circumscribed quadrangle
20a, 23a: one side
20b, 20c: side
21, 22: contact point
22a: upper contact point
23: upper circumscribed quadrangle
30, 30a: touch panel sensor
32: detection unit
33: peripheral wiring part
34A: first detection electrode layer
34B: second detection electrode layer
35: first detection electrode
36a: first dummy electrode
36b: second dummy electrode
37: second detection electrode
38: first electrode terminal
39: second electrode terminal
40a: first peripheral wire
40b: second peripheral wire
41a: first external connection terminal
41b: second external connection terminal
42: flexible circuit board
43: shield electrode
43a: first wiring part
43b: second wiring part
43c: third wiring part
43d: fourth wiring part
Ac: vertical cross section
DL: direction
DW: direction
$E_1$: detection region
$E_2$: peripheral region
R: observation region
$R_L$: contour line
Rb: region
Rm: contour line
S: maximum inscribed circle
T: height
Wa: line width

What is claimed is:

1. A conductive substrate comprising:
a substrate; and
a conductive thin wire arranged on the substrate and containing a metal,
wherein a proportion of a region that shows the metal within a maximum inscribed circle of the observation region where the metal is observed is 81% to 99% in a vertical cross section of the conductive thin wire in a direction orthogonal to a direction in which the conductive thin wire extends,
wherein a Gray value obtained by imaging the conductive thin wire using reflected light is 150 or less in terms of a value of brightness represented by 256 gradations,
wherein a line width of the conductive thin wire is 0.1 μm or more and less than 5.0 μm, and
wherein in a circumscribed quadrangle circumscribing the observation region where the metal is observed in which angles of four corners each have an angle of 90° and one side is parallel to a surface of the substrate, in a case where a quadrangle region of the circumscribed quadrangle on a side opposite to the surface of the substrate from an upper contact point which is set to one corner is defined as an upper circumscribed quadrangle, the upper contact point being located at a position farthest from the surface of the substrate among contact points between the observation region and sides of the circumscribed quadrangle perpendicular to the surface of the substrate, four corners of the upper circumscribed quadrangle each have an angle of 90°, and one side thereof is parallel to the surface of the substrate, and within the upper circumscribed quadrangle, in a case where a length of a contour of a region where the metal is present is denoted by Lm, a total length of four sides of the upper circumscribed quadrangle is denoted by Ls, and a ratio represented by Lm/Ls is denoted by γ, $1.3 \leq \gamma \leq 2.0$ is satisfied.

2. The conductive substrate according to claim 1,
wherein in the vertical cross section of the conductive thin wire in a direction orthogonal to a direction in which the conductive thin wire extends,
a ratio of a height of the conductive thin wire to a line width of the conductive thin wire is 0.6 or more and less than 1.5.

3. The conductive substrate according to claim 1,
wherein the substrate is constituted of a flexible film, and
wherein the flexible film contains polyethylene terephthalate, a cycloolefin polymer, a cycloolefin copolymer, or polycarbonate.

4. The conductive substrate according to claim 1,
wherein the metal contained in the conductive thin wire includes silver.

5. The conductive substrate according to claim 1,
wherein the metal contained in the conductive thin wire is silver.

6. The conductive substrate according to claim 1,
wherein the metal contained in the conductive thin wire has a particle shape.

7. The conductive substrate according to claim 1,
wherein the conductive thin wire contains a polymer.

* * * * *